United States Patent
Tallamy et al.

(10) Patent No.: US 10,223,410 B2
(45) Date of Patent: Mar. 5, 2019

(54) METHOD AND SYSTEM FOR ACQUISITION, NORMALIZATION, MATCHING, AND ENRICHMENT OF DATA

(71) Applicant: Cisco Technology, Inc., San Jose, CA (US)

(72) Inventors: Stephen Charles Tallamy, Sandhurst (GB); Laurent Edmond Pierre Bertrand, Twickenham (GB); Pete Rai, Egham (GB)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 14/474,153

(22) Filed: Aug. 31, 2014

(65) Prior Publication Data

US 2015/0193497 A1    Jul. 9, 2015

Related U.S. Application Data

(60) Provisional application No. 61/923,852, filed on Jan. 6, 2014.

(51) Int. Cl.
*G06F 17/30* (2006.01)
*G06N 5/02* (2006.01)

(52) U.S. Cl.
CPC ........ *G06F 17/30386* (2013.01); *G06N 5/02* (2013.01); *G06N 5/022* (2013.01)

(58) Field of Classification Search
CPC ........ G06F 17/30864; G06F 17/30867; G06Q 30/02

(Continued)

(56) References Cited

U.S. PATENT DOCUMENTS 5,787,415 A * 7/1998 Jacobson .......... G06F 17/30371
5,987,472 A * 11/1999 Serafin .............. G06F 17/30595

(Continued)

FOREIGN PATENT DOCUMENTS

CN    101231642 A    7/2008
CN    101739414 A    6/2010

(Continued)

OTHER PUBLICATIONS

International Search Report and Written Opinion for corresponding PCT/US2015/010074 dated Mar. 23, 2015.

(Continued)

*Primary Examiner* — Jeff A Burke
*Assistant Examiner* — Thong H Vu
(74) *Attorney, Agent, or Firm* — Merchant & Gould P.C.

(57) ABSTRACT

In one embodiment, a method includes obtaining a first data set from a first data source and a second data set from a second data source, the first data set including a first plurality of entities and the second data set including a second plurality of entities. The method also includes identifying a verified relationship between a first entity from the first plurality of entities and a second entity from the second plurality of entities and determining that a third entity from the first plurality of entities has a first same-as relationship with a fourth entity from the second plurality of entities based on one or more of the verified relationship or relationships between the first plurality of entities and the second plurality of entities. The method further includes generating first output data including the first same-as relationship.

19 Claims, 11 Drawing Sheets

(58) Field of Classification Search
USPC ....... 707/770, 724, 728, 748, 759, 722, 600, 707/769; 705/30
See application file for complete search history.

(56) References Cited

U.S. PATENT DOCUMENTS

| | | | | |
|---|---|---|---|---|
| 6,604,110 | B1* | 8/2003 | Savage | G06F 17/30563 707/602 |
| 6,865,567 | B1* | 3/2005 | Oommen | G06F 17/30463 |
| 6,993,533 | B1* | 1/2006 | Barnes | G06F 17/30554 |
| 7,822,781 | B2* | 10/2010 | Greene | G06Q 10/06311 704/10 |
| 7,890,543 | B2* | 2/2011 | Hunt | G06F 9/4433 707/803 |
| 8,122,023 | B2* | 2/2012 | Lewak | G06F 17/30997 707/736 |
| 8,180,722 | B2 | 5/2012 | John et al. | |
| 8,392,483 | B2 | 3/2013 | Lawrence | |
| 8,538,958 | B2 | 9/2013 | Varadarajan et al. | |
| 8,843,997 | B1* | 9/2014 | Hare | H04L 63/0281 709/200 |
| 8,856,087 | B2* | 10/2014 | Greene | G06Q 10/06311 705/7.11 |
| 2003/0233347 | A1* | 12/2003 | Weinberg | G06F 17/30312 |
| 2004/0024773 | A1* | 2/2004 | Stoffel | G06N 5/025 |
| 2005/0240621 | A1* | 10/2005 | Robertson | G06Q 10/06311 |
| 2007/0156767 | A1* | 7/2007 | Hoang | G06F 17/30014 |
| 2007/0226222 | A1* | 9/2007 | Yamamoto | G06Q 10/06 |
| 2008/0005086 | A1* | 1/2008 | Moore | G06F 17/30876 |
| 2008/0082393 | A1* | 4/2008 | Ozzie | G06F 17/30575 705/7.11 |
| 2008/0208620 | A1* | 8/2008 | Karkanias | G06F 19/3443 705/2 |
| 2008/0306726 | A1* | 12/2008 | Levy | G06F 17/2785 704/2 |
| 2009/0037440 | A1* | 2/2009 | Will | G06K 9/6219 |
| 2009/0144070 | A1* | 6/2009 | Psota | G06Q 10/083 705/330 |
| 2009/0204517 | A1* | 8/2009 | Edens | G06Q 10/06 705/30 |
| 2010/0100427 | A1 | 4/2010 | McKeown et al. | |
| 2010/0185643 | A1* | 7/2010 | Rao | G06F 17/30389 707/759 |
| 2011/0010366 | A1* | 1/2011 | Varshavsky | G06F 17/30864 707/732 |
| 2011/0167402 | A1 | 7/2011 | Ahmad | |
| 2011/0307440 | A1* | 12/2011 | Panchenko | G06F 17/30575 707/600 |
| 2012/0036130 | A1* | 2/2012 | Light | G06F 17/2785 707/736 |
| 2012/0072387 | A1* | 3/2012 | Yanase | G06F 17/30997 706/50 |
| 2012/0072402 | A1 | 3/2012 | Fraboulet-Laudy et al. | |
| 2012/0137367 | A1* | 5/2012 | Dupont | G06F 21/00 726/25 |
| 2012/0166316 | A1* | 6/2012 | Messina | G06Q 30/0641 705/27.1 |
| 2012/0278767 | A1* | 11/2012 | Stibel | G06Q 10/101 715/854 |
| 2013/0066903 | A1* | 3/2013 | Tymoshenko | G06F 17/30705 707/769 |
| 2013/0073571 | A1* | 3/2013 | Coulet | G06F 17/2785 707/755 |
| 2013/0151572 | A1* | 6/2013 | Brocato | G06F 17/30297 707/805 |
| 2013/0325850 | A1* | 12/2013 | Redmond | G06F 17/30864 707/722 |
| 2014/0115012 | A1 | 4/2014 | Das | |
| 2015/0234859 | A1* | 8/2015 | Johnson | G06F 17/30864 707/612 |

FOREIGN PATENT DOCUMENTS

CN 103150405 A 6/2013
WO 2010070142 A2 6/2010

OTHER PUBLICATIONS

Office Action for corresponding Chinese Appl. No. 201580003792.0 dated Dec. 26, 2017.
Office Action for corresponding Chinese Appl. No. 201580003792.0 dated Jul. 27, 2018.

* cited by examiner

METHOD AND SYSTEM FOR ACQUISITION, NORMALIZATION, MATCHING, AND ENRICHMENT OF DATA

RELATED APPLICATIONS

This application claims the benefit of U.S. Provisional Patent Application No. 61/923,852, filed on Jan. 6, 2014, the contents of which are hereby incorporated by reference for all purposes.

TECHNICAL FIELD

The present disclosure relates to data processing, and in particular, to methods and system for acquiring, normalizing, matching, and/or enriching data.

BACKGROUND

Information about real world entities (such as actors, movies, TV shows, seasons of TV shows, episodes of TV shows, directors, etc.) can exist in multiple digital domains and/or systems. Different systems represent and/or manage these entities in different ways. Different systems may also identify and/or reference these entities using different identifiers. For example, a particular movie may have different representation and identifiers in different systems such as TV schedules on different TV platforms, video on demand (VOD) systems, and websites.

Each of such systems typically has a limited view of an entity and the attributes and relationships associated with the entity. Such a limited view of each entity typically results in different systems having different information about the entities, thereby restricting the potential value that can be obtained from the data when used in a range of applications such as end-user experiences and data analytics. In addition, each system may have views on entities which may be subject to and/or part of an editorial construct of the system in question. For example, different systems may represent entities, attributes, and/or relationships differently.

BRIEF DESCRIPTION OF THE FIGURES

So that the present disclosure can be understood by those of ordinary skill in the art, a more detailed description may be had by reference to aspects of some illustrative implementations, some of which are shown in the accompanying drawings.

Figure 1:
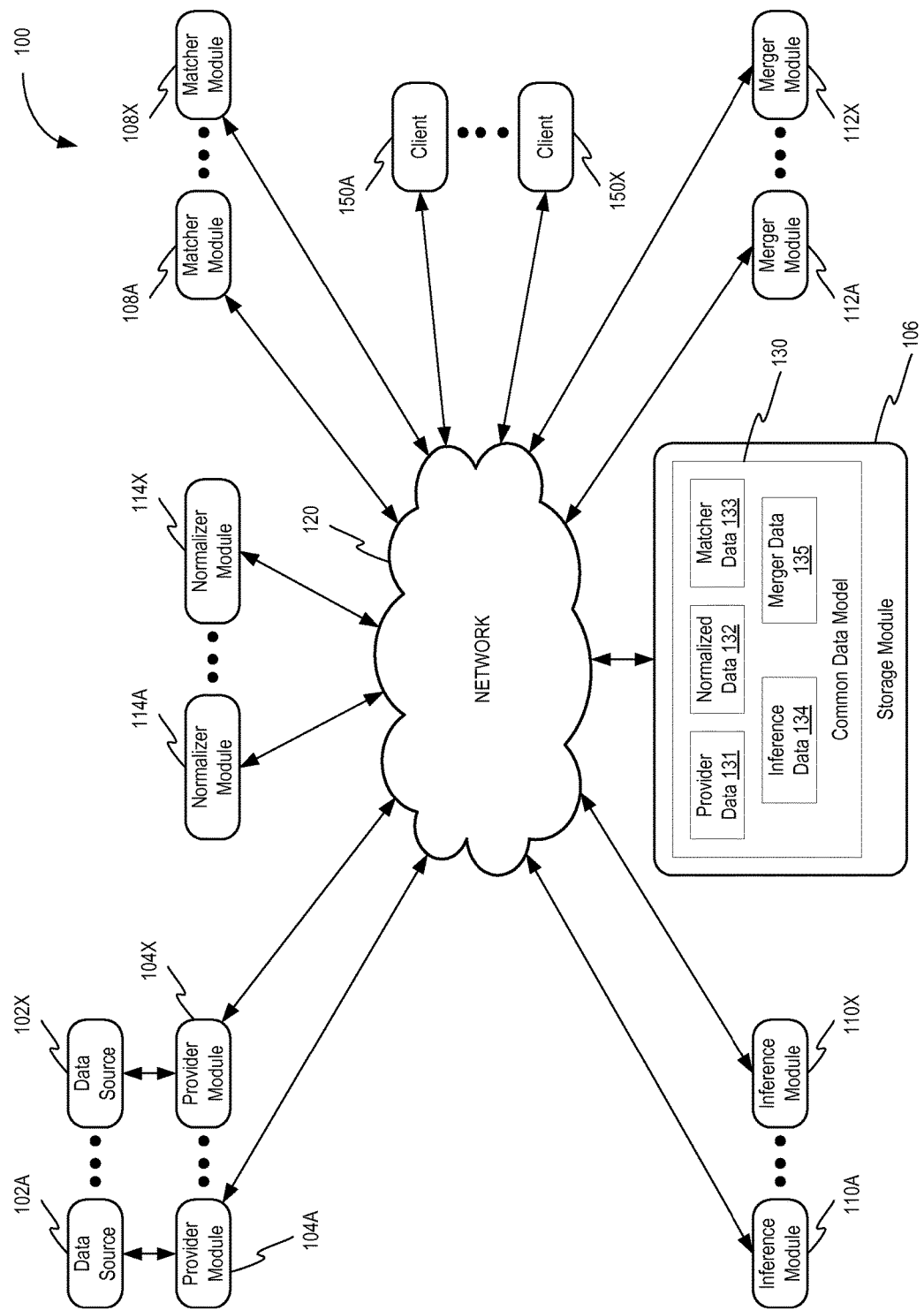
FIG. 1 is a block diagram illustrating an example system, in accordance with some embodiments.

In accordance with common practice various features shown in the drawings may not be drawn to scale, as the dimensions of various features may be arbitrarily expanded or reduced for clarity. Moreover, the drawings may not depict all of the aspects and/or variants of a given system, method or device admitted by the specification. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for generating data sets. For example, in some implementations, a method includes obtaining a first data set from a first data source and a second data set from a second data source, the first data set including a first plurality of entities and the second data set including a second plurality of entities. The method also includes identifying a verified relationship between a first entity from the first plurality of entities and a second entity from the second plurality of entities. The method further includes determining that a third entity from the first plurality of entities has a first same-as relationship with a fourth entity from the second plurality of entities based on one or more of the verified relationship or relationships between the first plurality of entities and the second plurality of entities, and generating first output data including the first same-as relationship.

In other implementations, a method includes receiving a plurality of data sets from a plurality of data providers, a plurality of matcher modules, and a plurality of inference modules, the plurality of data sets including conflicting data about one or more of an entity, an attribute, or a relationship between entities, further including same-as relationships identified by the plurality of matcher modules, and further including inferred data identified by the plurality of inference modules. The method also includes determining whether a first data set from the plurality of data sets identifies entities, attributes, and relationships using a common set of predicates and modifying the first data set to identify entities, attributes, and relationships using the common set of predicates when the first data set does not use the common set of predicates.

In further implementations, a method includes receiving a plurality of data sets from a plurality of data providers, a plurality of matcher modules, and a plurality of inference modules, the plurality of data sets including same-as relationships identified by the plurality of matcher modules and inferred data identified by the plurality of inference modules. The method also includes receiving an indication of a trust level, the trust level indicative of one or more of allowed data providers, allowed matcher modules, allowed inference modules, allowed relationship qualifiers, or allowed attribute qualifiers and identifying a first subset of the plurality of data sets that satisfy the trust level. The method further includes generating an output data set based on the first subset, the output data set including a second subset of same-as relationships and a third subset of the inferred data.

DETAILED DESCRIPTION

As society and information become more interconnected, it is desirable for information systems to be interconnected in an improved manner. People, such as end-users, typically expect to be able to share or obtain data between systems, expect more detail, and expect a more coordinated end-user experience. For example, audiences may have an expectation that a movie in a VOD catalogue should have a link to a social media website to allow interactions about the movie in a social context. In addition, in many domains, it is often in a vendor's interest to lock its data into its system with little or no incentive to link with other data sources. Thus, a system (e.g., an independent system) that can formulate linkages between data sources with a desired level of truth/trust may be generally desirable. As described herein, such a system can be configured to determine whether selected entities associated with different data sources are indeed the same entity.

Various embodiments disclosed herein include apparatuses, systems, and methods for acquiring, normalizing, matching, and/or enriching data. The various apparatuses, systems, methods, and/or techniques may be implemented to address at least some of the foregoing issues. Such techniques may yield linked data by use of algorithms to thereby allow, for example, different representations of the same entity to be declared to be the same with a selected level of confidence. Examples of such techniques are described herein in greater detail.

The data may include entities, relationships between entities, and/or attributes. In one embodiment, different data sets may be obtained and/or received from different data sources. The data sets may be normalized by different normalizer modules. In one embodiment, data sets may then be analyzed by different matcher modules to identify relationships between entities of the data sets (e.g., to identify "same-as" relationship or to identify entities that match, as discussed below). Inference modules may also identify inferred relationships and/or inferred attributes based on other relationships and/or attributes, including the relationships identified by the matcher modules. Merger modules may generate different output data sets based on the output of the inference modules and/or matcher modules.

In one embodiment, the system uses an underlying common data model that allows different types of modules (e.g., provider modules, normalizer modules, matcher modules, inference modules, etc.) to process data differently and store the processed data. The various modules may be decoupled from each other (e.g., may be independent of each other) which may allow users to pick and choose which modules the users would like to use and/or to substitute in new modules when available. The common data model allows for conflicting views of data to exist and allows users to select different sets of data based on trust levels and/or trust chains. The common data model allows different output data sets to be generated based on the different trust levels and/or trust chains. This may allow different systems to make use of the same underlying data but apply different requirements to drive their specific use cases. It also allows systems to coordinate around common views of data.

While some of the embodiments, examples, and/or implementations are described herein in the context of entities, relationships, and/or attributes associated with entertainment (e.g., related to movies and/or TV), it will be understood that one or more features of the present disclosure can also be implemented in other applications and/or domains. Such applications and/or domains may include, for example, price comparisons of products between different retailers such as supermarkets.

FIG. 1 is a block diagram illustrating an example system 100 in accordance with some embodiments. In one embodiment, the system 100 may allow data to be acquired, normalized, matched, inferred, and/or enriched. The system 100 may include a number of components to facilitate such functionality. The system 100 includes provider modules 104A through 104X, normalizer module 114A through 114X, matcher modules 108A through 108X, inference modules 110A through 110X, merger module 112A through 112X, clients 150A through 150X, and a storage module 106 all communicatively coupled to each other via a network 120. The system further includes data sources 102A through 102X. The data sources 102A through 102X may be communicatively coupled to the provider modules 104A through 104X (e.g., via a network), respectively. In one embodiment, network 120 may include a public network (e.g., the Internet), a private network (e.g., a local area network (LAN)), or wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

In one embodiment, the system 100 may use an underlying common data model 130 that enables and/or includes some or all of the following features. In one embodiment, the common data model 130 may be stored in the storage module 106. In another embodiment, the common data model 130 (or portions of the common data model 130) may be stored on one or more data storage devices (e.g., hard drives, flash drives, databases, memories, etc.) that may be separate from the storage module 106. The one or more data storage devices may be communicatively coupled to the storage module 106 and the storage module 106 may access, process, analyze, and/or use the common data model 130. The common data model 130 includes provider data 131, normalized data 132, matcher data 133, inference data 134, and merger data 135. Different provider modules may obtain data sets from different data sources (as discussed below) and the data sets may be stored in the provider data 131. Different normalizer modules may normalize data sets differently (as discussed below) and the different normalized data sets may be stored in the normalized data 132. Different matcher modules may identify different relationships between entities in the data sets (as discussed below) and the different relationships may be store in the matcher data. Different inference modules may identify different inferred attributes and/or inferred relationships (as discussed below)

and the different inferred attributes and/or inferred relationships may be stored in the inference data 134. Different merger modules may generate different output data sets based on different trust levels and/or trust chains (as discussed in more detail below) and the different output data sets may be stored in the merger data 135. In one embodiment, the storage module 106 may be configured to provide a rights tracked semantic store for entities and relationships. For example, the storage module may be aware of whether data (e.g., relationships, attributes, etc.) is rights free and/or whether the data satisfies different trust levels.

Because different provider modules may obtain different data sets from different data source, the system 100 allows overlapping or conflicting data. For example, different data sources may indicate different ages for an actor. Examples of how various components (e.g., normalizer component 114, matcher component 108, inference module 110, and/or merger component 112) may handle such situations are described herein in greater detail. Different trust levels and/or trust chains may be specified by a user of the system 100. Because different trust levels and/or trust chains are part of the system 100 and are used by the underlying common data model 130, the system 100 may be able to generate an output data set that satisfies a specified trust level and/or trust chain. In one embodiment, a trust chain (e.g., a chain of trust) may refer to the ensuring that the data generated and/or used by each component of the system 100 to generate an output data set (e.g., a rights free data set) satisfies a trust level. For example, a trust chain may refer to ensuring that a provider module that generates provider data satisfies a trust level, that the normalizer module that uses the provider data to generate normalized data satisfies the trust level, that the matcher that uses the normalized data to generate matcher data satisfies the trust level, etc.

The data sources 102A through 102X may be computing devices and/or storage devices (e.g., databases) that may provide access to data and/or data sets. Although multiple data sources 102A through 102X are illustrated in FIG. 1, other embodiments may include any number of data sources (e.g., one data source, twenty-five data sources, etc.). It is noted that a given data source 102A through 102X may be associated with one or more data providers. Data sets received from the data sources 102A through 102X may be owned by respective owners. The data sets (received from the data sources 102A through 102X) may relate to and/or represent entities. Such entities may represent a real world entity of a particular type (e.g., a person, a physical item, a location, and/or content such as a movie or TV show). Data concerning a particular entity may be owned by an owner and may be referenced using an identifier or key. Examples of entities may be a movie (e.g., a motion picture) or an actor (e.g., a person who is in a movie or a television (TV) show), an item sold by store (e.g., a supermarket, an online vendor, etc.). Entities may include one or more attributes and such attributes may have one or more values. An attribute may be additional data and/or information about an entity. An attribute may be a value, such as string, number, alphanumeric string, etc. An attribute may also include multiple values (e.g., multiple names, multiple dates, etc.). For example, an attribute for an actor entity (e.g., an entity representing an actor) may be the age of the actor. Other example attributes include a name (e.g., a name of an actor or a name of a movie), dates (e.g., birthday of an actor, release date of a movie), etc. The data sets (received from the data sources 102A through 102X) may also include relationships. Relationships may be links and/or associations between different entities. For example, an actor entity may be in a relationship (e.g., an "in-cast" relationship) with a movie entity (e.g., an entity that represents a movie) because the actor starred in the movie.

The data sets (received from the data sources 102A through 102X) may also include predicates. Predicates may be sets of terms to label and/or identify attributes and/or relationships. For example, a "same-as" relationship may indicate that an entity from one data set is the same as (e.g., matches) and entity from another data set. In another example, an in-cast relationship between an actor entity and a movie entity may indicate that the actor starred in the movie. Predicates may be standardized and/or controlled so that the predicates may be standard or common across the system 100. For example, the storage module 106 may analyze the data sets that are in the common data model 130. The storage module 106 may help enforce a standard or common set of predicates across the data sets in the common data model 130 (as discussed in more detail below). Predicates may be thought of as names for relationships and/or attributes. In one embodiment, a predicate may labeled as normative (e.g., labeled as a normative predicate) or may be labeled as positive (e.g., labeled as a positive predicate). A positive predicate may identify a relationship and/or attribute that is based on one or more objective facts and/or information. For example, the age of an actor (e.g., the age attribute of an actor entity) may be a positive predicate because the age of the actor is an objective fact. In another example, a positive predicate may imply that there is a "true" answer or fact available that may be objectively proved. A normative predicate may identify a relationship and/or predicate that is on subjective information. For example, a review (e.g., a movie critic's review) of a movie may be a normative predicate because the review of the movie is a subjective opinion of the person reviewing the movie. In one embodiment, the predicates may be used for selection of epistemology and ongoing usage of the data. In another embodiment, if information (e.g., a relationship and/or an attribute) is based on a normative predicate, all subsequent information (e.g., subsequent attributes) based on the information may generally be considered normative.

Attributes and relationships may also include additional qualifiers that may be used to determine the basis on which the data was obtained. For example, a qualifier may indicate whether the data is the result of original research (e.g., including human qualified entry), inspection (e.g., from looking at source data), and/or inference (e.g., data that is implied and/or inferred from original or inspected data). The qualifiers may also indicate whether an attribute and/or relationship is normative or positive. For example, a "Review" attribute may include a qualifier indicating that the attribute is normative. In another example, an "Age" attribute may include a qualifier indicating that the attribute is positive.

As discussed above, the system 100 includes provider modules 104A through 104X. Although multiple provider modules 104A through 104X are illustrated in FIG. 1, other embodiments may include any number of provider modules. The provider modules 104A through 104X may be configured to provide and/or facilitate one or more functionalities as described herein. For example, the provider modules 104A through 104X may be configured to acquire data from the data sources 102A through 102X, respectively. Such acquisition of data may be achieved by, for example, techniques including but not limited to an API (application programming interface), a remote procedure call (RPC), function calls, libraries (e.g., dynamically linked libraries (DLLs)), database queries, web crawling, and data file ingest (e.g., receiving and/or processing data files from the data sources).

The provider modules 104A through 104X may store data received from the data sources 102A through 102X, respectively, in the provider data 131 on the storage module 106. In some embodiments, some of the provider modules 104A through 104X may store data in different formats in the provider data 131. For example, provider module 104A may store dates in a different format than provider module 104X. In another example, provider module 104X may store text in upper case while provider module 104A may store text in upper and lower case. This may result in data that are in different forms (e.g., aligned to different enumerations or numerical formats) and such differences may be resolved by the normalizer modules 114A through 114X (as discussed in more detail below). In one embodiment, the provider modules 104A through 104X may be provided by the owners of the data sources 102A through 102X. For example, the provider module 104A may be an API provided by the owner of the data source 102A. In another embodiment, there may be different versions of a provider module. For example, a later version of a provider module 104A may provide new information about entities, relationships, and/or predicates (e.g., about the data from the data source 102A) while maintaining one or more earlier versions of the information. The different versions of the information may also be stored in the provider data 131.

In some implementations, data can be obtained by crawling. To support restartable data crawling, the storage module 106 may be configured to support tracking of whether an entity has been fully seen or only partially identified from a relationship. The storage module 106 can return a backlog of items to visit based on this information plus a timestamp of the last visit.

Also as discussed above, the system 100 includes normalizer modules 114A though 114X. Although multiple normalizer modules 114A through 114X are illustrated in FIG. 1, other embodiments may include any number of normalizer modules. The normalizer modules 114A through 114X may be configured to provide and/or facilitate one or more functionalities as described herein. For example, the normalizer modules 114A through 114X may be configured to normalize the provider data 131 so that the provider data 131 may be used by other components of the system 100 (e.g., matcher modules 108A through 108X, inference modules 110A through 110X, etc.). Normalizing the provider data 131 may include converting the data into an appropriate and/or standard format. For example, date formats can be converted to a standard and/or selected format (e.g., month-date-year, or year-month-date, etc.). In another example, text may be converted to be all upper/lower case, to remove accented characters (e.g., "e"), and/or to remove punctuation (e.g., commas, exclamation marks, etc.). The normalizer modules 114A through 114X may store the data that is processed and/or converted (e.g., the normalized provider data 131) in the normalized data 132 on the storage module 106. In one embodiment, each normalizer module 114A through 114X may also normalize data (e.g., process and/or convert data) differently. For example, different normalizer modules may use upper or lower case, may use different date formats, may retain or remove different punctuation, etc.

The normalizer modules 114A through 114X may analyze text (e.g., numbers, letters, alphanumeric strings) and convert all non-ASCII accented characters to their ASCII equivalent, replace multiple white space groups to single space character, remove all punctuation (e.g., full stop, comma, dash, etc.), adjust characters to lower case, and/or trim any leading or trailing white space. The normalizer modules 114A through 114X may also convert dates (e.g., date attributes such as date of release for a movie) to just the year value or convert the date to a particular format (e.g., year-month-date). The normalizer modules 114A through 114X may also map attributes into a normalized set of attributes. For example, the values sport, sports, sports games may get mapped to "Sport." In another example, a movie entity that has a genre attribute of romantic comedy may be mapped to romantic, comedy, or both (e.g., two genre attributes may be used). The normalizer modules 114A through 114X may also round numbers to certain decimal places to normalize data (e.g., attributes of entities). The normalizer modules 114A through 114X may also combine multiple attributes into one attribute. For example, latitude and longitude coordinates (e.g., degrees, minutes, and/or seconds) may be converted to a decimal latitude value. The normalizer modules 114A through 114X may also split one attribute into multiple attributes. For example, an attribute with the value "London, UK" may be split into two attributes with the first attribute having the value "London" and the second attribute having the value "UK."

In one embodiment, different normalizer modules 114A through 114X may satisfy different trust levels and/or be included in different trust chains. For example, if normalizer 114A satisfy a trust level then the output data (e.g., normalized data) generated by the normalizer 114A may also satisfy the trust level. The output data may be provided to another module (e.g., another normalizer module and/or a matcher module) that also satisfies the trust level in order to maintain a trust chain for the output data.

As discussed above, the system 100 includes matcher modules 108A through 108X. Although multiple matcher modules 108A through 108X are illustrated in FIG. 1, other embodiments may include any number of matcher modules. The matcher modules 108A through 108X may be configured to provide and/or facilitate one or more functionalities as described herein. For example, the matcher modules 108A through 108X may be configured to identify relationships (e.g., same-as relationships) between entities of the data sets (received from the data sources 102A through 102X) based on various techniques, algorithms, functions, operations, and/or user input. The relationships between entities may be stored in the matcher data 133. Different matcher modules may identify different relationships (e.g., based on different algorithms) and the different relationships may be stored in the matcher data 133. In one embodiment, the matcher modules 108A through 108X may identify same-as relationships between entities in different data sets. For example, the matcher modules 108A through 108X may determine that a first actor entity in a first data set received from data source 102A is the same as (e.g., matches) a second actor entity in a second data set received from the data source 102B.

The matcher modules 108A through 108X may use various techniques, algorithms, functions, and/or operations to identify same-as relationships between entities. In one embodiment the matcher modules 108A through 108X may use a seeded walk technique. The seeded walk technique may use one or more seeds that include one or more same-as relationships between entities which have been found by, for example, original research (e.g., research performed by a user). These seeds may be referred to as verified relationships because the seeds (e.g., the same-as relationships) are considered to be verified, for example, by original research. The entities in the verified relationships may be referred to as seed entities. The matcher modules 108A through 108X may use these seeds (e.g., verified relationships) to identify candidate relationships based on existing relationships between the seed entities and other entities and based on data overlaps (e.g., same normalized name attribute and/or qualified type). The candidate relationships may be evaluated to be true if a threshold number of additional relationships can be found between other entities associated with the two seed entities involved in the candidate relationship (as discussed in more detail below). For example, if two or more additional relationships exist, a candidate relationship may be reclassified as a qualified relationship (e.g., a strict match or an accurate match). In such an example, two relationships may provide a lower limit of additional relationships for determining whether a relationship (e.g., a candidate same-as relationship) is a qualified relationship (e.g., a strict match) match or a candidate relationship (e.g., a loose match). In other embodiments, the threshold number of additional relationships may be different. In one embodiment, the matcher modules 108A through 108X may perform multiple seeded walks using multiple verified relationships. This may allow the matcher modules 108A through 108X to identify additional same-as relationships and may help prevent "islands" of data within the data sets. For example, using multiple seeded walks may allow the system 100 to identify additional same-as relationships and these additional same-as relationships may allow the system 100 to branch out and identify additional attributes and/or additional relationships. This may also allow the system 100 to infer additional inferred attributes and/or additional inferred relationships based on the additional attributes and/or additional relationships.

In one embodiment, different matcher modules 108A through 108X may satisfy different trust levels and/or be included in different trust chains. For example, if matcher module 114A satisfies a trust level then the output data (e.g., matcher data) generated by the matcher module 114A may also satisfy the trust level. The output data may be provided to another module (e.g., an inference module or a merger module) that also satisfies the trust level in order to maintain a trust chain for the output data.

The seeded walk algorithm (discussed in more detail below) is an example of an algorithm for identifying same-as relationships that may be implemented by the matcher modules 108A through 108X. The seeded walk algorithm may work well with symbiotic entities where it may be possible to walk between different entity types and discover more of the opposite or related type of entity. For example, relationships between people (e.g., actors, directors, etc.) and content (e.g., movies, shows, etc.) may be symbiotic entities. In some embodiments, the number of seeds (e.g., the number of verified relationships) may be small (e.g., one or more). For example, an actor (e.g., an actor entity) who has appeared in a wide range of movies (e.g., movie entities) may provide an effective seed for the foregoing seeded walk algorithm. In other embodiments, the system 100 of FIG. 1 may be configured to support other types of matcher modules. In some embodiments, matcher modules can be configured to provide different levels of match (e.g., strict or loose matches).

Although the seeded walk algorithm is discussed in conjunction with FIG. 1, it should be understood that in other embodiments, a matcher module may use various other algorithms to identify same-as relationships. For example, a matcher module may analyze entities to identify movie entities with the same normalized title, same qualified type, and with at least two cast members (e.g., two actor entities) with the same normalized name. In another example, a matcher module may analyze the TV show entities and compare all episode entities that are children entities of TV show entities and may identify episode entities with the same normalized name. In a further example, a matcher module may analyze movie entities and identify movie entities that have the same normalized name and year of production. In a further example, a matcher module may analyze attributes of different entities and determined a weighted score of attributes (e.g., certain attributes are given a higher score) that match between the entities. An example weighting factor may be that a match in the title attributes of two movie entities is given more weight than a release date attribute of the two movie entities. Entities with a weighted score that is greater than a threshold score may be identified as having a same-as relationship.

Also as discussed above, the system 100 includes inference modules 110A through 110X. Although multiple inference modules 110A through 110X are illustrated in FIG. 1, other embodiments may include any number of inference modules. The inference modules 110A through 110X may be configured to provide and/or facilitate one or more functionalities as described herein. For example, the inference modules 110A through 110X may identify additional relationships and/or additional attributes for entities based on information known about entities (e.g., based on relationships and/or attributes of the entities). The additional relationships and/or additional attributes may be referred to as inferred relationships and/or inferred attributes. The inference modules 110A through 110X may operate in parallel and/or in series with the matcher modules 108A through 108X. When operating in series, the inference modules 110A through 110X may use output of the matcher modules 108A through 108X. For example, the inference modules 110A through 110X may use the matcher data 133 generated by the matcher modules 108A through 108X. When operating in parallel, the inference modules 110A through 110X may use output of the provider modules 104A through 104X. For example, the inference modules 110A through 110X may use the provider data 131 generated by the provider modules 104A through 104X.

The inference modules 110A through 110X may generate and/or identify additional attributes and/or additional relationships. The additional attributes and/or additional relationships may be identified and/or labeled using a set of predicates (e.g., using one or more predicates). For example, calculations can be made for the number of seasons based on the number of episodes of a TV show entity. In another example, regular co-stars (e.g., actor entities) may be identified based on relationships between cast members (e.g., actor entities) of a TV show. In yet another example, determinations may be made for gender (e.g., a sex or gender attribute) based on parent/child relationships between actors (e.g., if an actor is somebody's son, then the actor can be inferred to be male), other family relationships (e.g., grandfather, etc.), an actor's most popular movies, and/or the roles that an actor is most known for (e.g., main roles). In some embodiments, same-as relationships may be identified as a result of inspection of the data sets instead of inference. For example, if a data source provides an explicit link to the same entity as in another data source, a same-as relationship (e.g., a match) may be identified.

In one embodiment, different inference modules 110A through 110X may satisfy different trust levels and/or be included in different trust chains. For example, if inference module 110A satisfies a trust level then the output data (e.g., matcher data) generated by the inference module 110A may also satisfy the trust level. The output data may be provided to another module (e.g., a merger module) that also satisfies the trust level in order to maintain a trust chain for the output data.

The inference modules 110A through 110X may use various algorithms to generated inferred attributes (e.g., new attributes) and/or inferred relationships (e.g., new relationships). For example, an inference module may use a set of seed entities (of different types) and examine the same-as relationships from each entity to other entities. The inference module may identify new same-as relationships between all entities found from these relationships then traverse all new entities (e.g., the entities in the new same-as relationships) to find further same-as relationships. This may be repeated until no more new same-as relationships are identified. In another example, the inference module may analyze TV show entities and may count the total number of episodes entities (e.g., upsides of the TV show) and the ranges of season numbers found. In a further example, the inference module may analyze actor entities and may examine content entities (e.g., movie entities, TV show entities, etc.) that have in-cast relationships with the actor entities. The inference module may analyze the order in which actor entities are listed in the casts of the content entities (e.g., determine which actor is listed first, second third, etc., in the cast of a movie) and may infer that an actor is most known for a movie if the actor appears higher and/or highest in the cast of the movie. In yet another example, the inference module may analyze people entities (e.g., actor entities, director entities, producer entities, etc.) and their relationships to content (e.g., movie entities, TV show entities, etc.). The inference module may infer the occupation of a particular person based on these relationships (e.g., infer that a person is a producer, an actor, a director, etc.). The inference module may further analyze the genre attributes of the content entities to further infer the occupation of a particular person (e.g., the person is a comedy actor, an action director, etc.). The inference module may also examine relationships between people entities (e.g., actor entities) to identify co-star relationships between the people entities.

Also as discussed above, the system 100 includes merger modules 112A through 112X. Although multiple merger modules 112A through 112X are illustrated in FIG. 1, other embodiments may include any number of merger modules. The merger modules 112A through 112X may be configured to surface or yield a rights-free data set by cross referencing a plurality of independent data sources. The merger modules 112A through 112X may use one or more of the provider data 131, normalized data 132, matcher data 133, and inference data 134 to generate an output data set. In one embodiment, the output data set may include rights-free data generated by multi-sourcing of overlapping non-normative facts. In some embodiments, the rights-free data can be extracted from positive attributes (e.g., facts) and/or relationships associated with corresponding entities. For example, rights-free data may indicate that a particular movie was released in a particular year (e.g., may indicate a positive attribute such as a release date attribute) or may indicate that an actor is forty years old (e.g., may indicate a positive attribute such as an age attribute). The data from this process can be owned by the system (e.g., 100 in FIG. 1) and may be made available without licensing the data (e.g., may be made available freely). It will be understood that in some embodiments, the output data set generated by the merger modules 112A through 112X may not necessarily be rights-free.

In one embodiment, in situations where algorithms used by the matching modules, inference modules, and merger modules belong to a provider (e.g., a data source owner), different providers may have different domains of consideration (e.g., a first provider may deal with content such as movies and a second provider may deal with products sold in a store). Such a situation may allow for many overlapping and even conflicting statements to be made. As described herein, it is possible to select an epistemology that is trustworthy for a given domain of consideration. Such a trustworthy epistemology can be utilized to build a chain of trust, which can start from the trust of the base data, and then trust of the rules applied and the context in which they were applied.

In some embodiments, the system 100 of FIG. 1 can be configured to support extraction of the latest known view of data by tracking visits of data as it is provided. In some embodiments, some or all historic data can be stored should it be required or desired.

In one embodiment, the separation of various steps in the data processing chain (e.g., obtaining or gathering data sets, normalizing data sets, matching entities, inferring additional data, etc.) into different interchangeable components or modules may allow new versions of rules to be implemented in a more flexible manner with little or no data loss, thereby providing more efficient techniques for matching. In another embodiment, one or more features of the system 100 may handle multiple views of various entities associated with different owners and providers. Furthermore, the system 100 may be configured to allow plug-in of different algorithms for the rules and/or establish flexible trust chains.

Some other advantages provided by the system 100 may include, for example, implementation of flexible links that can bring together different systems to thereby enable many cross-functional use applications. In another example, data enrichment can be enabled in many applications. In yet another example, techniques associated with the present disclosure may provide a much better semantic understanding of the entities than those provided by current content management systems. In yet another example, techniques associated with the present disclosure may allow data to be released into a rights-free domain.

In some embodiments, the provider modules 104A through 104X, normalizer module 114A through 114X, matcher modules 108A through 108X, inference modules 110A through 110X, merger module 112A through 112X may each reside on separate computing devices (e.g., may each be on separate server computing devices). In other embodiments, some of the provider modules 104A through 104X, normalizer module 114A through 114X, matcher modules 108A through 108X, inference modules 110A through 110X, merger module 112A through 112X may reside on the same computing device.

Although the present disclosure may refer to content (e.g., movies, TV shows) and people (e.g., actors, directors, producers, etc.), it should be understood that the embodiments described herein may be applied to different domains of data that include other types of entities, relationships, and/or attributes. For example, data sources 102A through 102X, provider modules 104A through 104X, normalizer module 114A through 114X, matcher modules 108A through 108X, inference modules 110A through 110X, merger module 112A through 112X, and storage module 106 may be used in the domain of shopping (e.g., online shopping or in-store shopping). In another example, a matcher module may match normalized names of products and/or types of products (e.g., food products, sports products) to identify same-as relationships. In a further example, an inference module may analyze product entities (e.g., entities that represent products sold by a store) to identify entities that represent bundled products (e.g., a product that includes multiple other product). The entities that represent bundled products may include attributes and/or other information that may be used to generate inferred attributes and/or inferred relationships. The inference module may also analyze product entities to identify products that have the same name and/or brand (e.g., name attribute or brand attribute) but have different weights and/or dimensions (e.g., different weight attributes or dimension attributes). The inference module may add a relationship between two products indicating that a first product is a bigger or smaller version of another product.

The clients 150A through 150X may be computing devices (e.g., desktop computers, server computers, tablet computers, smartphones, etc.) that may request output data sets (e.g., rights-free data) from the system 100. For example, a user of client 150A may send a message, a request, and/or other data indicating that the user wants an output data set. The user may also provide a trust level and/or trust chain that the system 100 may use to generate the output data set. In one embodiment, the storage module 106 may generate the output data and may store the output data set on a data storage device (e.g., a hard disk, a memory, a database etc.) so that the user may access the output data set. In another embodiment, the storage module 106 may generate the output data set and may transmit the output data set to the user (e.g., transmit the data to the client 150A).

Figure 2A:
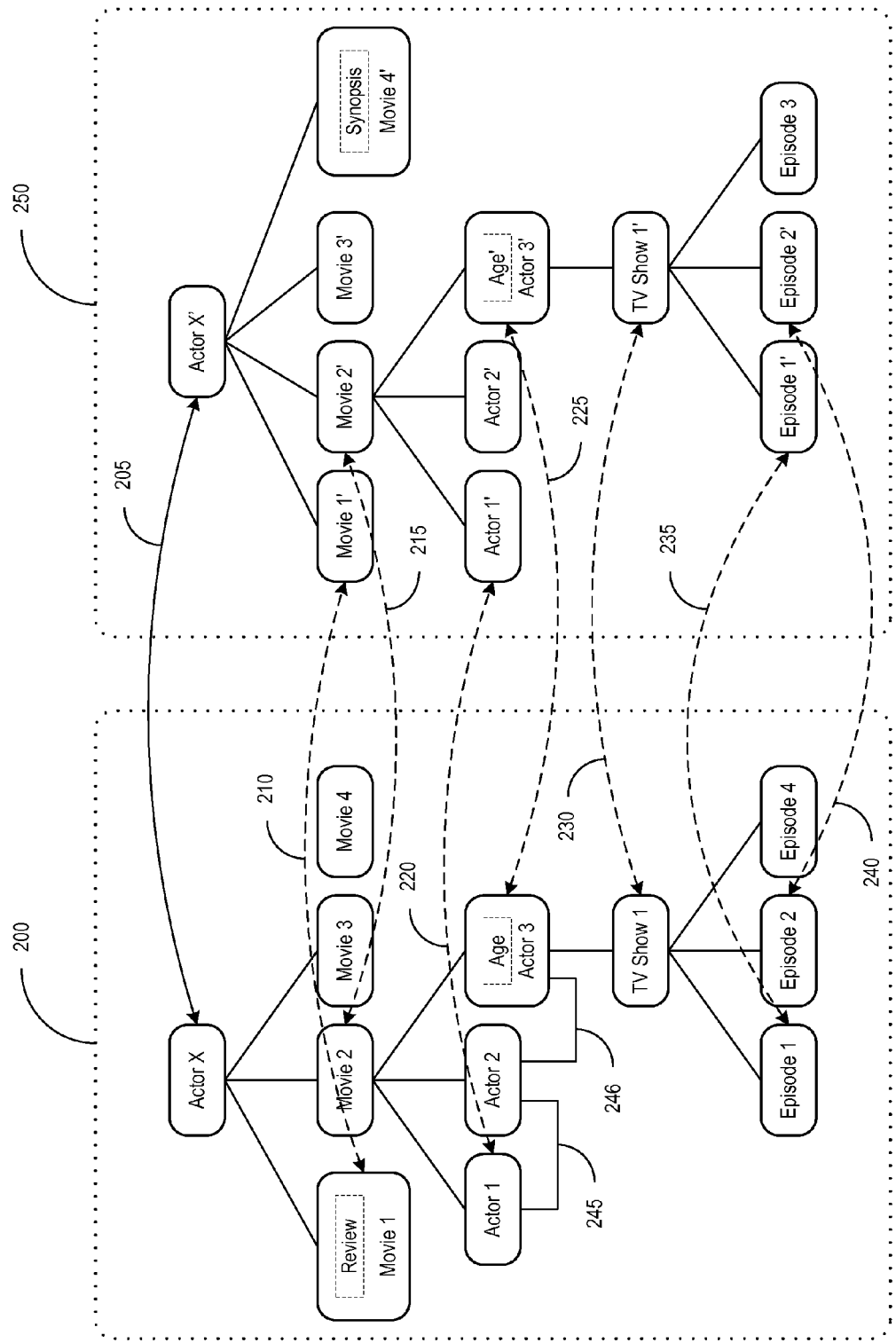
FIG. 2A is a block diagram illustrating two example data sets associated with two providers and/or data owners, in accordance with some embodiments.

FIG. 2A is a block diagram illustrating two example data sets 200 and 250 associated with two providers and/or data owners, in accordance with some embodiments. For example, data set 200 may be received from a first data source and data set 250 may be received from a second data source. Data sets 200 and 250 includes a plurality of entities (e.g., Actor 1, Movie 1, Movie 2', TV Show 1, Episode 1') represented using solid boxes. Some of the entities may include attributes which are represented using dashed boxes. For example, the entity Actor 3 includes an Age attribute. The value of the Age attribute may indicate the age of Actor 3. As illustrated in FIG. 2A, dashed lines may indicate candidate relationships. Lines that include arrows at the endpoints may indicate relationships identified and/or determined by a matcher module. Lines that do not include arrows at the endpoints may indicate relationships that were included in the data received from the first data source and the second data source.

An example of the seeded walk algorithm is illustrated in FIG. 2A using the example data sets 200 and 250. The seeded walk algorithm may begin with a seed (e.g., a seed relationship) that includes a verified same-as relationship 205 between the entity Actor X of the data set 200 and the entity Actor X' of the data set 250. The verified same-as relationship 205 may be the result of original research performed by a user. The entities, relationships and/or predicates in the data set 200 may be a subset of the entities, relationships, and/or predicates that are received from the first data source. For example, the entities, relationships and/or predicates in the data set 200 may be selected and/or identified because they are the entities, relationships and/or predicates in the data set 200 associated with the entity Actor X. The entities, relationships and/or predicates in the data set 250 may be a subset of the entities, relationships, and/or predicates that are received from the second data source. For example, the entities, relationships and/or predicates in the data set 250 may be selected and/or identified because they are the entities, relationships and/or predicates in the data set 250 associated with the entity Actor X'.

In one embodiment, the entities of the data sets 200 and 250 may be traversed and/or analyzed starting at the seed entities Actor X and Actor X' to determine whether one or more entities in the data set 200 have a same-as relationship with one or more entities in the data set 250. In the first data set 200, Actor X is identified as having an in-cast relationship with a number of movie entities, including Movie 1, Movie 2, Movie 3, and Movie 4. The entity Movie 1 also includes a Review attribute. The Review attribute may be text (e.g., sentences and/or paragraphs) that include a movie critics review of the Movie 1. In the second data set 250, Actor X' is identified as having an in-cast relationship with a number of movies, including Movie 1', Movie 2', Movie 3', and Movie 4'. In the example of FIG. 2A, a matcher module (e.g., as illustrated in FIG. 1) may determine that Movie 1 has a candidate same-as relationship 210 same-as relationship with Movie V. For example, the matcher module may analyze data generated by normalizer modules (e.g., normalized data) and/or provider modules (e.g., provider data) and may determine that the title of Movie 1 (e.g., the title attribute) matches the title of Movie 1'. However, entities Movie 1 and Movie 1' may not be deemed to have a qualified same-as relationship because a threshold number of additional relationship (e.g., a threshold number of additional same-as relationships) between other entities associated with Movie 1 and Movie 1' have not been identified. The matcher module may determine that Movie 2 also has a candidate same-as relationship 215 with Movie 2'. The matcher module may also determine that Movie 4 and Movie 4' do not have any relationship.

The matcher module may continue traversing the entities in the data sets 200 and 250 by analyzing entities that are in relationships with the entity Movie 2 and the entity Movie 2'. For example, entities Actor 1, Actor 2, and Actor 3 in the first data set 200 have an in-cast relationships with entity Movie 2. The entity Actor 1 may have a "son-of" relationship 245 with Actor 2 indicating that Actor 1 is a son (e.g., a male child) of Actor 2. The entity Actor 2 may have a "son-of" relationship 246 with Actor 3 indicating that Actor 2 is a son (e.g., a male child) of Actor 3. The entity Actor 3 includes an Age attribute which may indicate the age of Actor 3. Entities Actor 1', Actor 2', and Actor 3' in the second data set 250 have an in-cast relationship with the entity Movie 2'. The entity Actor 3' includes an Age' attribute which may indicate the age of Actor 3'. The entities Movie 2 and Movie 2' may be selected for further seeded walk due to their same-as relationship, to thereby maintain a chain of trust. The matcher module may further determine that the entities Actor 1 and Actor 1' have a candidate same-as relationship and that the entities Actor 3 and Actor 3' also have a candidate same-as relationship. For example, the matcher module may determine that the normalized name attribute of Actor 1 matches the normalized name attribute of Actor V. The matcher module may determine that Actor 2 and Actor 2' have no relationship (e.g., their name attributes to not match).

The matcher module may continue traversing the entities in the data sets 200 and 250 by analyzing entities that are in relationships with the entity Actor 3 and the entity Actor 3'. Actor 3 has an in-cast relationship with the entity TV Show 1 and Actor 3' has an in-cast relationship with the entity TV Show V. The entity TV Show 1 has an "episode-of" relationship with the entities Episode 1, Episode 2 and Episode 4 (e.g., a relationship that indicates that Episodes 1, 2, and 4 are episodes of the TV Show 1). The entity TV Show 1' has an "episode-of" relationship with the entities Episode 1', Episode 2' and Episode 3 (e.g., a relationship that indicates that Episodes 1', 2', and 3 are episodes of the TV Show 1'). The matcher module may further determine that TV Show 1 has a candidate same-as relationship 230 with TV Show 1', Episode 1 has a candidate same-as relationship 235 with Episode 1', and Episode 2 has a candidate same-as relationship 240 with Episode 2'.

Figure 2B:
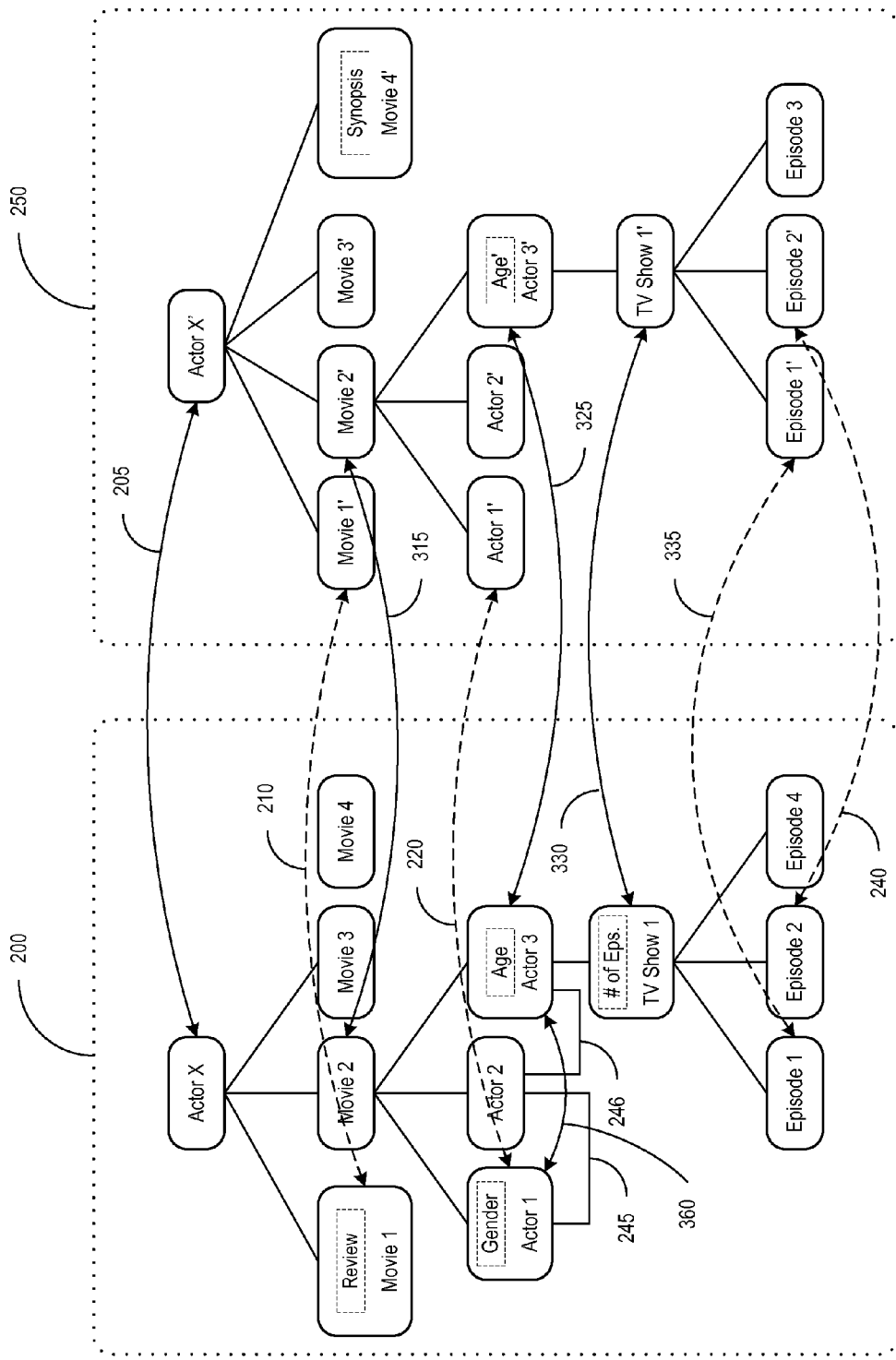
FIG. 2B is a block diagram illustrating two example data sets associated with two providers and/or data owners, in accordance with some embodiments.

FIG. 2B is a block diagram illustrating two example data sets 200 and 250 associated with two providers and/or data owners, in accordance with some embodiments. As discussed above data sets 200 and 250 includes a plurality of entities (e.g., Actor 1, Movie 1, Movie 2', TV Show 1, and Episode 1') represented using solid boxes. Some of the entities may include attributes. As illustrated in FIG. 2B, solid lines may indicate qualified relationships and dashed lines may indicate candidate relationships. Lines that include arrows at the endpoints may indicate relationships identify and/or determined by a matcher module. Lines that do not include arrows at the endpoints may indicate relationships that were included in the data received from the first data source and the second data source. As discussed above, a candidate relationship (e.g., a loose relationship) between two entities may be reclassified as a qualified relationship (e.g., a strict or accurate relationship) if a threshold number of additional relationships exist between additional entities that are associated with the two entities. In the example of FIG. 2B, a candidate relationship between two entities may be reclassified as a qualified relationship if at least two additional relationships exist between additional entities that are associated with the two entities.

Referring to FIG. 2A, the relationship 215 between Movie 2 and Movie 2' is a candidate same-as relationship. However, Actor 1 (which is associated with Movie 2) is in a candidate same-as relationship 220 with Actor 1' (which is associated with Movie 2') and Actor 3 (which is associated with Movie 2) is in a candidate same-as relationship 225 with Actor 3' (which is associated with Movie 2'). Because two additional relationships (e.g., relationships 225 and 220) exist between additional entities (e.g., Actor 1, Actor 1', Actor 3, and Actor 3') that are associated with the two entities Movie 2 and Movie 2', the relationship 215 may be reclassified as a qualified same-as relationship 315 (as illustrated in FIG. 2B). Similarly, relationships 225 and 230 (illustrated in FIG. 2A) may be reclassified as qualified same-as relationships 325 and 330, respectively.

In the foregoing seeded walk example, the extension of the walk from the TV shows to the episodes is based on the existence of a same-as relationship (e.g., between TV Show 1 and TV Show 1'). In the absence of such a same-as relationship, the chain of trust can end at the TV show level. However, if the chain of trust can be extended with a weaker link at this level, there may be a number of useful relationships that can be formulated. Accordingly, in some implementations, seeded walk can continue based on, for example, candidate status or even lower level of correlation.

An example of the generating and/or identifying an inferred attribute and/or an inferred relationship is also illustrated in FIG. 2B using the example data sets 200 and 250. An inferred attribute may be an attribute that was not part of the data provided by the first data source and the second data source. The inferred attribute may be identified based on relationships between the entities of the data sets 200 and 250 (as discussed in more detail below). An inferred relationship may be a relationship that was not part of the data provided by the first data source and the second data source. The inferred relationship may be identified based on relationships between the entities of the data sets 200 and 250 (as discussed in more detail below). The inferred attributes and/or inferred relationships may be generated and/or identified by an inference module (as illustrated in FIG. 1).

For example, referring to FIG. 2A, Actor 1 is in a son-of relationship 245 with Actor 2 indicating that Actor 1 is a son (e.g., a male child) of Actor 2. Based on the son-of relationship 245, the inference module may determine that Actor 1 is male. Referring to FIG. 2B, the inference module may generate and/or identify a Gender attribute for Actor 1 and the value of the Gender attribute may be "male." In another example, TV Show 1 has a same-as relationship 330 with TV Show V. Using the same-as relationship 330, the inference module may determine that the data set 200 indicates that Episodes 1, 2, and 4 are episodes of TV Show 1 and that Episodes 1', 2', and 3 are episodes of TV Show F. Based on the different episode entities (e.g., Episode 1, Episode 2, Episode 1', Episode 2', Episode 3, and Episode 4) and the relationships between the episode entities, the inference module may determine that there are a total of four different episodes of the TV Show 1. The inference module may determine and/or identify a new attribute labeled "# of Eps." and may set the value of the attribute to "4" to indicate that there are a total of four episodes of the TV Show 1.

The inference module may also generate and/or identify a new relationship 360. The relationship 360 may be a "grandfather-of" relationship indicating that Actor 3 is the grandfather of Actor 1. The grandfather-of relationship 360 may be inferred based on the son-of relationship 245 and the son-of relationship 246. For example, if Actor 1 is the son of Actor 2 and Actor 2 is the son of Actor 3, then Actor 3 is the grandfather of Actor 1. The grandfather-of relationship 360 may be a qualified relationship even though the grandfather-of relationship 360 is not based on a threshold number of additional relationships. The grandfather-of relationship 360 may be a qualified relationship because the grandfather-of relationship 360 is based on the qualified son-of relationship 245 and the qualified son-of relationship 246.

Figure 3:
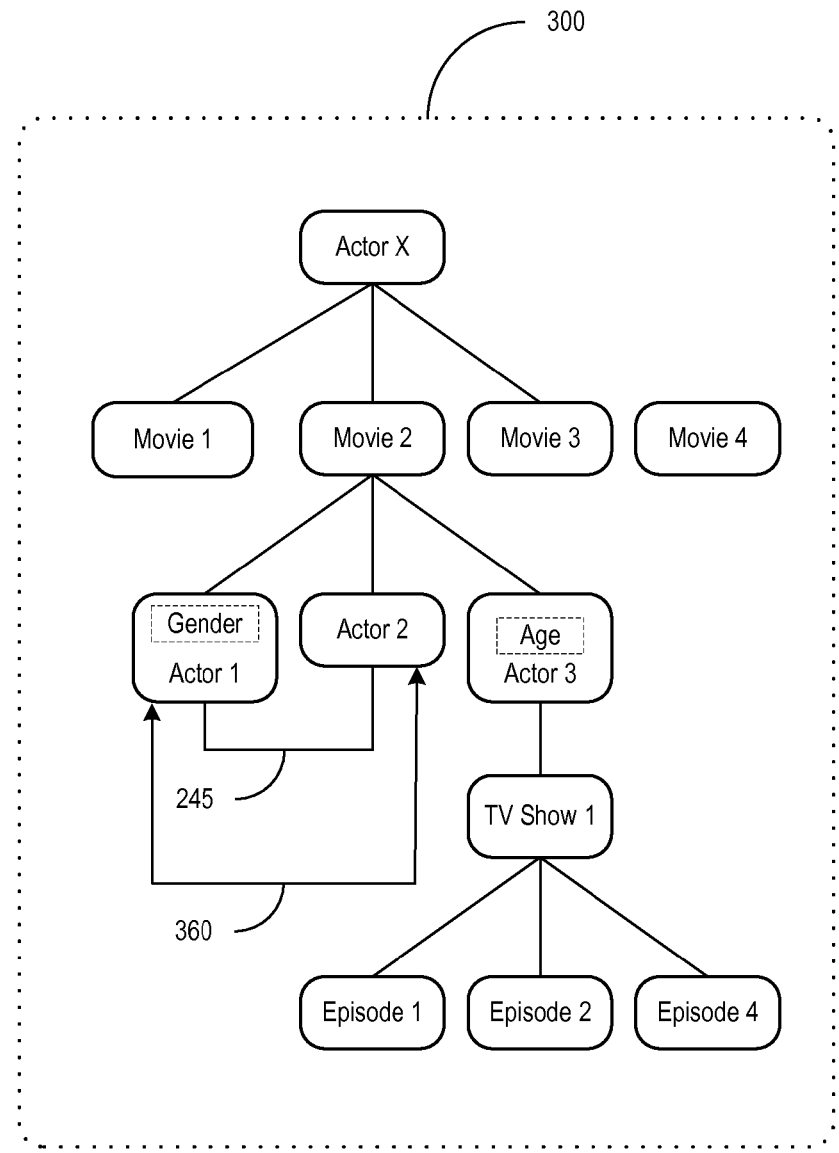
FIG. 3 is a block diagram illustrating an example data set, in accordance with some embodiments.

FIG. 3 is a block diagram illustrating an example data set 300, in accordance with some embodiments. In one embodiment, the data set 300 may be an output data set that is generated by a merger module (as illustrated in FIG. 1). As discussed above, a merger module may be configured to generate (e.g., surface or yield a rights-free data set) by cross referencing a plurality of independent data sources. For example, referring to FIGS. 2A and 2B, the merger module may analyze relationships (e.g., qualified and candidate relationships identified by one or more matcher modules), inferred attributes (generated and/or identified by one or more inference modules), and/or inferred relationships (generated and/or identified by one or more inference modules).

As illustrated in FIG. 3, the data set 300 includes the Gender attribute for Actor 1. Referring to FIG. 2B, the Gender attribute was generated based on the son-of relationship 245 with Actor 2 indicating that Actor 1 is a son (e.g., a male child) of Actor 2. Because the Gender attribute may be a positive fact (e.g., is not subjective or based on an opinion), the merger module may include the Gender attribute in the data set 300. The data set 300 may also include the Age attribute of Actor 3 because the Age attribute may also be a positive fact. Referring to FIG. 2B, the data set 300 does not include the Review attribute of Movie 1 because the Review attribute may be a normative attribute (e.g., may be subjective).

In one embodiment, the merger module may analyze the output data generated by multiple provider modules, matcher modules, normalizer modules, and/or inference modules (e.g., may analyze the provider data 131, normalized data 132, matcher data 133, inference data 134, and merger data 135). The merger module may use different trust levels to determine whether relationships and/or attributes generated and/or identified by the provider modules, matcher modules, normalizer modules, and/or inference modules should be included in the output data set. A trust level may indicate of a desired level of accuracy and/or trust for data (e.g., entities, relationships, attributes, etc.). For example, a first trust level may indicate that only positive facts and/or qualified relationships may be allowed. A second trust level may indicate that certain normative facts (e.g., a synopsis may be used but a review should not be used), positive facts, and qualified relationships may be allowed. A trust level may also indicate preferred provider modules, matcher modules, normalizer modules, and/or inference modules. For example, a user may prefer that the output data generated by a particular set of provider modules, matcher modules, normalizer modules, and/or inference modules. Some of the multiple provider modules, matcher modules, normalizer modules, and/or inference modules may satisfy a certain trust level. The merger may use output data generated by the provider modules, matcher modules, normalizer modules, and/or inference modules that satisfy the certain trust level to generate an output data set (e.g., output data set 300).

In one embodiments, output data set 300 may be a rights-free data. For example, the output data set 300 may be extracted from positive attributes (e.g., facts) and/or relationships associated with corresponding entities. In another example, the output data set may include normative attributes if the owner of the normative attribute allows the normative attribute to be distributed and/or made available freely (e.g., the owner allows or licenses out the normative attribute). It will be understood that one or more features of the present disclosure may generate and output data set that is not necessarily rights-free. For example, the output data set may include a Review attributed that is copyrighted by an owner.

Figure 4:
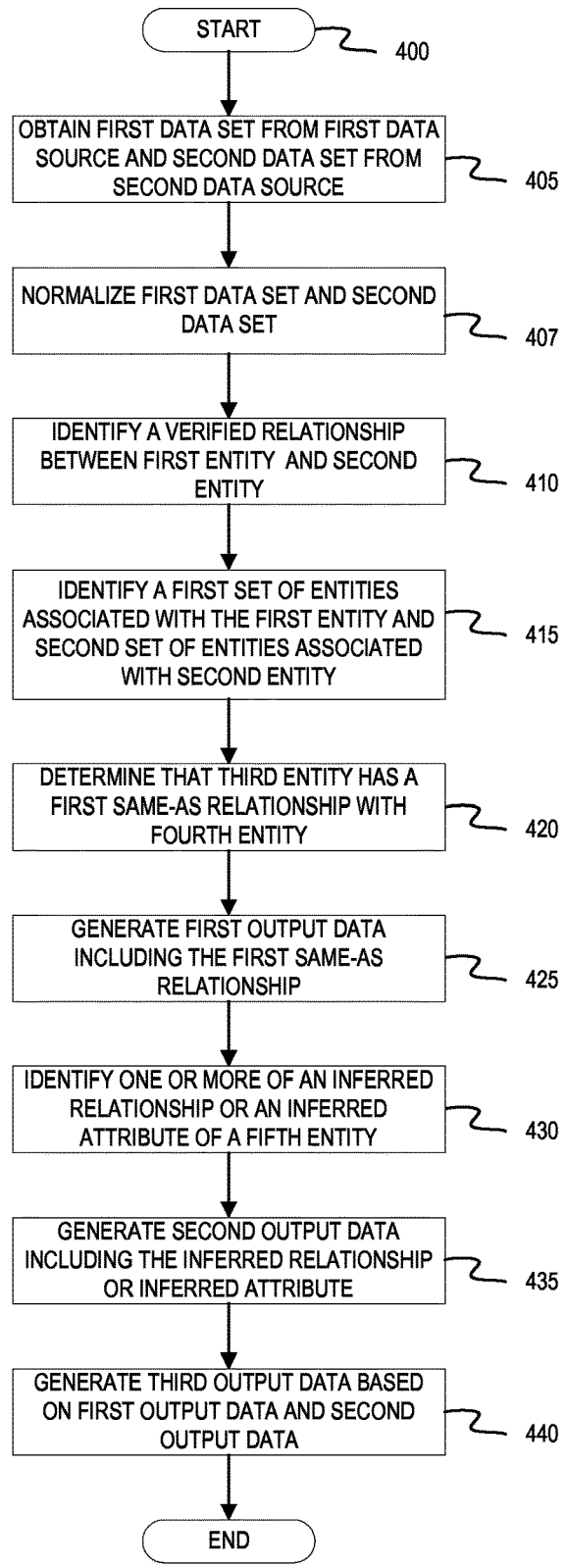
FIG. 4 is a flowchart representation of a method of generating a data set, in accordance with some embodiments.

FIG. 4 is a flowchart representation of a method 400 of generating a data set, in accordance with some embodiments. In some implementations, the method 400 may be performed by one or more of a provider module (as illustrated in FIG. 1), a normalizer module (as illustrated in FIG. 1), a matcher module (as illustrated in FIG. 1), an inference module (as illustrated in FIG. 1), a merger module (as illustrated in FIG. 1), and/or a computing device (e.g., a server computing device). Briefly, method 400 includes obtaining data sets, identifying same-as relationships between entities of the data sets, identifying inferred attributes and/or inferred relationships, and generating an output data set. The method 400 begins at block 405 where the method obtains a first data set from a first data source and a second data set from a second data source. For example, referring to FIG. 1, a first data set (including a first plurality of entities, relationships, and/or attributes) may be received from data source 102A and a second data set (including a second plurality of entities, relationships, and/or attributes) may be received from the data source 102B. The method 400 may normalize the first data set and the second data set at block 407. For example, the method 400 may convert date attributes (e.g., dates) to a certain format, convert name attributes (e.g., names) to lower or upper case, etc. Referring to FIG. 1, the method 400 may generate normalized data 132 when normalizing the first data set and/or second data set.

At block 410, the method 400 identifies a verified relationship between a first entity in the first data set and a second entity in a second data set. For example, referring to FIG. 2A, the method 400 may receive data indicating that the entity Actor X and Actor X' have a verified same-as relationship. The method 400 identifies a first subset of entities associated with a first entity from the first data set and a second subset of entities associated with the second entity from the second set of entities at block 415. For example, referring to FIG. 2A, the method 400 may identify data sets 200 and 250. At block 420, the method 400 may determine that a third entity from the first subset of entities has a first same-as relationship with a fourth entity from the second subset of entities. For example, referring to FIG. 2A, the method 400 may identify one or more of the relationships 210, 215, 220, 225, 230, and 240. The first same-as relationship between the third entity and the fourth entity may be a qualified relationship or a candidate relationship (as discussed above). The method 400 may generate first output data that includes the first same-as relationship at block 425. For example, referring to FIG. 1, the method 400 may generate matcher data 133 that includes the first same-as relationship and/or data indicative of the first same-as relationship.

At block 430, the method 400 may identify one or more of an inferred relationship or an inferred attribute of a fifth entity. The inferred relationship and/or inferred attribute may be identified based on one or more of a relationship between entities of the first plurality of entities and the second plurality of entities and/or attributes of the first plurality of entities and the second plurality of entities. For example, referring to FIG. 2B, the method 400 may generate, identify, and/or infer the Gender attribute of the entity Actor 1 and/or may generate, identify, and/or infer the grandfather-of relationship 360. The method 400 may generate second output data that includes inferred relationship and/or the inferred attribute at block 435. For example, referring to FIG. 1, the method 400 may generate inference data 134 that includes the inferred relationship and/or the inferred attribute. At block 440, the method 400 may generate third output data (e.g., may generate an output data set) based on the first output data and the second output data. For example, the method 400 may generate an output data set that includes rights free data (as discussed above). Referring to FIG. 1, the method 400 may store the output data set in the merger data 135.

Figure 5:
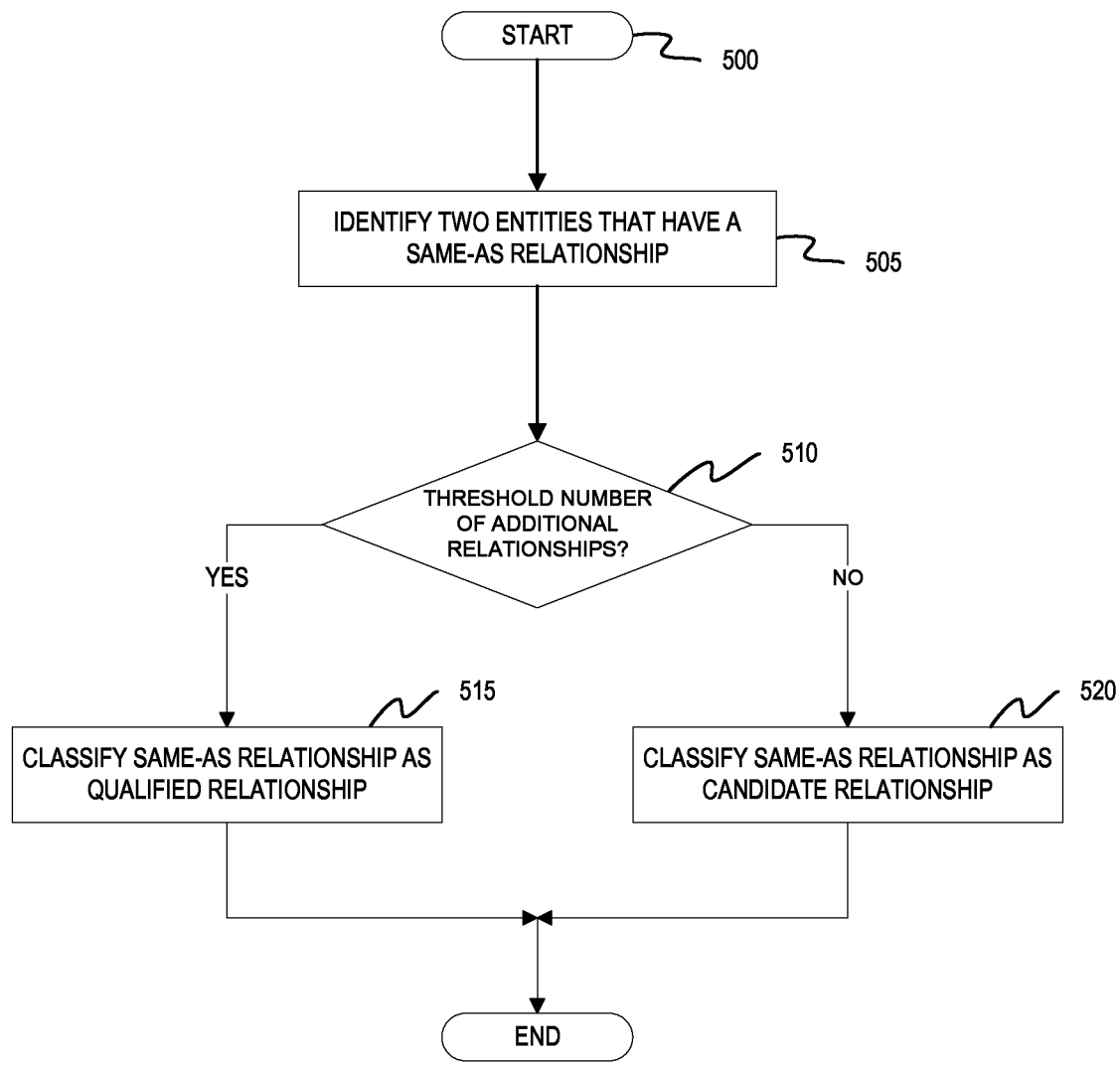
FIG. 5 is a flowchart representation of a method of classifying relationships, in accordance with some embodiments.

FIG. 5 is a flowchart representation of a method 500 of classifying relationships, in accordance with some embodiments. In some implementations, the method 500 may be performed by one or more of a provider module (as illustrated in FIG. 1), a normalizer module (as illustrated in FIG. 1), a matcher module (as illustrated in FIG. 1), an inference module (as illustrated in FIG. 1), a merger module (as illustrated in FIG. 1), and/or a computing device (e.g., a server computing device). Briefly, method 500 includes identifying a same-as relationship between two entities, a first entity and a second entity, and classifying the same-as relationship. The method 500 begins at block 505 where the method 500 identifies two entities that have a same-as relationship. For example, referring to FIG. 2A, the method 500 may identify the entities Movie 2 and Movie 2' which have a same-as relationship 215.

At block 510, the method 500 determines whether a threshold number of additional relationships between other entities associated with the first entity and second entity exist. It should be understood that any number may be used for the threshold number of additional relationships (e.g., one, two, four, ten, etc.). For example, referring to FIG. 2B, the method 500 may determine whether entities in the data set 200 that are associated with the entity Movie 2 are in relationships with entities in the data set 250 that are associated with the entity Movie 2'. Referring to FIG. 2B, the method 500 may determine whether the entities Actor 1, Actor 3, Actor 1', and Actor 3' are also in relationship. If the threshold number of additional relationships exists, the same-as relationship may be classified as a qualified relationship (e.g., a strict or accurate relationship) at block 515. For example, referring to FIG. 2B, the same-as relationship 215 may be classified as a qualified relationship because at least two same-as relationships 220 and 330 exist. If the threshold number of additional relationships do not exist, the same-as relationship may be classified as a candidate relationship (e.g., a strict or accurate relationship) at block 515. For example, referring to FIG. 2B, the same-as relationship 210 may be classified as a candidate relationship.

Figure 6:
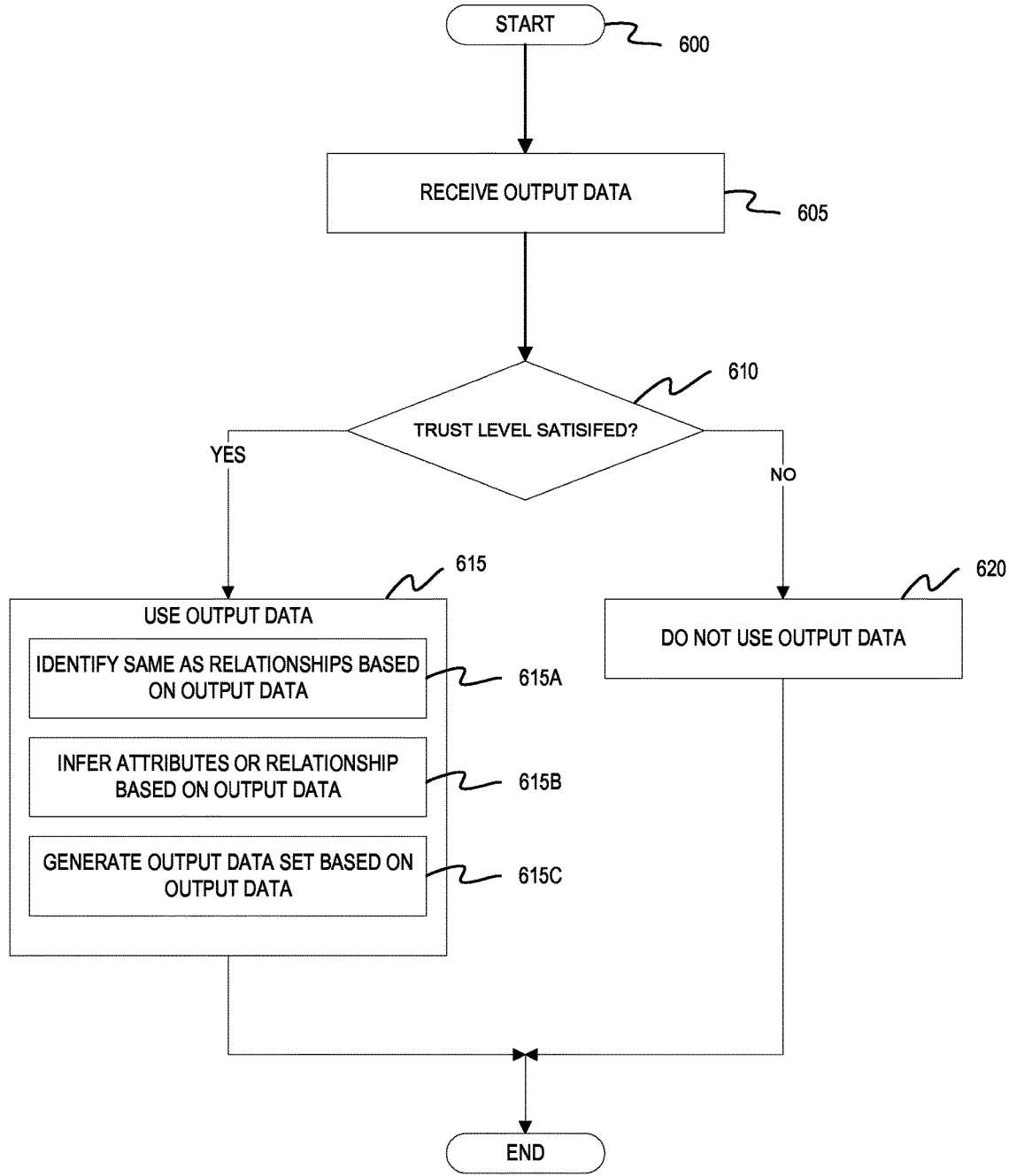
FIG. 6 is a flowchart representation of a method of determining whether output data satisfies a trust level, in accordance with some embodiments.

FIG. 6 is a flowchart representation of a method 600 of determining whether output data satisfies a trust level, in accordance with some embodiments. In some implementations, the method 600 may be performed by one or more of a provider module (as illustrated in FIG. 1), a normalizer module (as illustrated in FIG. 1), a matcher module (as illustrated in FIG. 1), an inference module (as illustrated in FIG. 1), a merger module (as illustrated in FIG. 1), and/or a computing device (e.g., a server computing device). Briefly, method 400 includes obtaining output data, determining whether the output data satisfies a trust level, and generating an output data set based on the output data if the trust level is satisfied. The method begins at block 605 where the method obtains output data. For example, referring to FIG. 1, a matcher module may obtain normalized data 132, an inference module may obtain matcher data 133, and/or a merger module may obtain inference data 134.

The method 600 may determine whether a trust level is satisfied at block 610. For example, the method 600 may determine whether the normalized data generated by a particular normalizer module satisfies the trust level (e.g., may determine whether the normalizer module is trusted). In another example, the method 600 may determine whether matcher data generated by a particular matcher module satisfies the trust level (e.g., may determine whether the matcher module is trusted). If the output data (e.g., the normalized data, the matcher data, the inference data, etc.) does not satisfy the trust level, the output data is not used at block 620. If the output data does satisfy the trust level, the output data is used to generate additional output data at block 615. In one embodiment, as represented by block 615A, the method 600 may identify same-as relationships based on the output data. For example, referring to FIG. 1, if the provider data (e.g., output data) from a provider module satisfies the trust level, a matcher module may use the provider data to identify same-as relationships between entities. In another embodiment, as represented by block 615B, the method 600 may identify inferred attributes and/or inferred relationships based on the output data. For example, referring to FIG. 1, if the matcher data (e.g., output data) from a matcher module satisfies the trust level, an inference module may use the matcher data to identify inferred attributes and/or inferred relationships. In a further embodiment, as represented by block 615C, the method 600 may generate an output data set based on the output data. For example, referring to FIG. 1, if the inference data (e.g., output data) and/or matcher data (e.g., output data) satisfies the trust level, a merger module may use the inference data and/or matcher generate an output data set that may include rights-free data.

Figure 7:
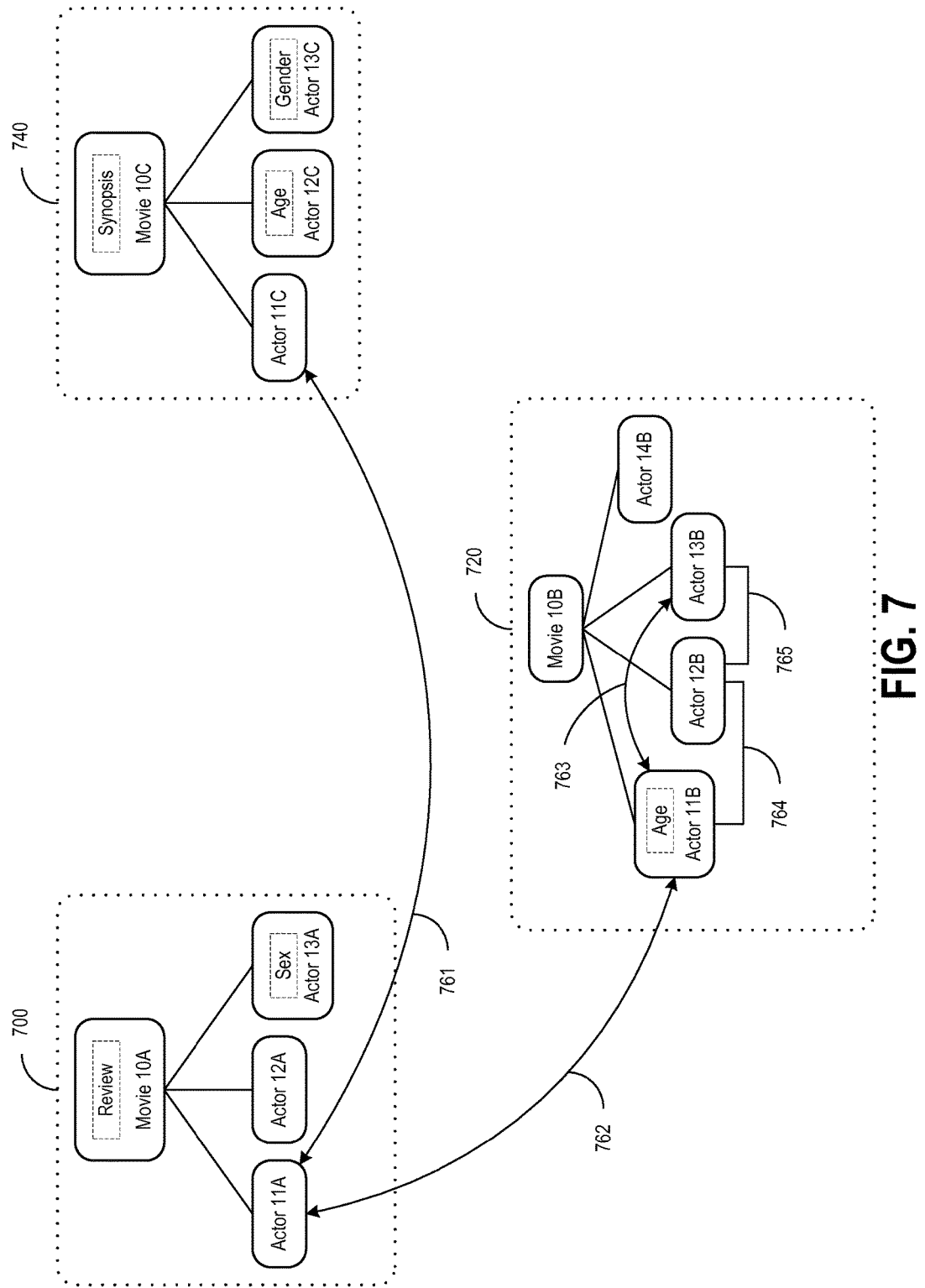
FIG. 7 is a block diagram illustrating example data sets, in accordance with some embodiments.

FIG. 7 is a block diagram illustrating example data sets 700, 720, and 740, in accordance with some embodiments. The data sets 700, 720, and 740 may be part of a system that may receive the data sets, analyze/process the data sets, and/or generate output data sets (e.g., system 100 illustrated in FIG. 1). Data sets 700, 720, and 740 include a plurality of entities (e.g., Actor 11A, Movie 10B, Actor 13C, etc.) represented using solid boxes. Some of the entities may include attributes which are represented using dashed boxes. For example, the entity Actor 12C includes an Age attribute. The value of the Age attribute may indicate the age of Actor 12C. Some of the attributes and/or relationships in the data sets 700, 720, and 740 may be normative and some of the attributes and/or relationships in the data sets may be positive. For example, the Age, Gender, and Sex attributes may be positive attributes. The Review and Synopsis attributes may be normative attributes. As illustrated in FIG. 7, lines that include arrows at the endpoints may indicate relationships identified and/or determined by a matcher module and/or inference module. Lines that do not include arrows at the endpoints may indicate relationships that were included in the data sets when the data sets were received.

As discussed above, predicates may be sets of terms to label and/or identify attributes and/or relationships. Predicates may be standardized and/or controlled so that the predicates may be standard or common. A storage module (e.g., storage module 106 illustrated in FIG. 1) may help enforce the set of predicates used across the data sets that are generated and/or used by the system (e.g., system 100 illustrated in FIG. 1). The predicates that are allowed by the system may be referred to as the allowed set of predicates or the common set of predicates. The data sets 700, 720, and 740 may be associated with different data providers and/or data owners. For example, data set 700 may be received from a first provider module (for a first data source), data set 720 may be received from a second provider module (for a second data source), and data set 740 may be received from a third provider module (for a third data source).

As illustrated in FIG. 7, Actor 13A of data set 700 includes the attribute "Sex" and Actor 13C of the data set 740 includes the attribute "Gender." The storage module may use the predicate "Gender" for the attribute identifying the sex/gender of an actor. The predicate "Sex" used in the data set 700 may not be in the allowed set of predicates (e.g., predicates that are allowed by the storage module). The storage module may enforce the set of predicates by modifying and/or causing the data sets to be modified. In one embodiment, the storage module may modify the predicate "Sex" (e.g., an incorrect predicate) in the data set 700 to an allowed predicate (e.g., a predicate that is in the allowed set of predicates). For example, the storage module may determine that the predicate "Sex" in the data set 700 refers to the attribute identifying the sex/gender of an actor. The storage module may determine that the "Gender" attribute in the allowed set of predicates should be use and may modify the predicate "Sex" in the data set 700 to the predicate "Gender." The storage module may optionally send a message and/or other data to the first data provider indicating that the predicate "Sex" was changed to the predicate "Gender." In another embodiment, the storage module may not modify predicates (for relationships and/or attributes) in a data set when the predicates are not in the allowed set of predicates (e.g., when the predicates are incorrect). For example, the storage module may not modify the predicate "Sex" in the data set 700. The storage module may send a message and/or other data to the first data provider (or module that generated the data set) indicating that the data set 700 includes predicates that are not in the allowed set of predicates. The storage module may not allow the data set 700 to be stored in the common data model for the system until the incorrect predicates (e.g., the predicates that are not in the allowed set of predicates) are corrected.

In another embodiment, the storage module may also enforce the use of the predicates for the data sets that are generated and/or by other modules (e.g., provider modules, normalizer modules, matcher modules, inference modules, and/or merger modules). For example, an inference module may infer a new relationship (e.g., an inferred relationship) and the predicate that identifies the new relationship may not be in the allowed set of predicates. The storage module may modify the predicate for the new relationship and/or may send a message to the inference module indicating that the predicate for the new relationship is not in the allowed set of predicates.

In one embodiment, the storage module may also allow new predicates to be added to the allowed set of predicates. For example, a data provider may send a message and/or request (via a menu and/or a user interface) indicating that a new predicate (e.g., "Nicknames") should be added to the allowed set of predicates. The storage module may provide the message and/or request to an administrator of the system. The administrator may allow the new predicate to be added to the allowed set of predicates.

As discussed above, the system may store, analyze and/or process data sets for various different domains of data. For example, the system may store, analyze and/or process data sets for the domain of shopping (e.g., for vendors and/or purchases of goods) and the system may also store, analyze and/or process data sets for the domain of entertainment (e.g., for movies, TV shows, actors, etc.). The different domains of data may have different allowed sets of predicates. For example, the predicate "Item Name" may be in a first allowed set of predicates for the domain of shopping, but may not be in a second allowed set of predicates for the domain of entertainment. The storage module may determine and/or identify the appropriate domain (or domains) for a data set and may use the appropriate allowed set of predicates for the appropriate domain (or domains). For example, each data set in the system may be associated with one or more different domains. The storage module may determine whether the predicates in the data set are within the allowed set of predicates for the one or more different domains. The storage module may also enforce a set of allowed predicates across multiple domains. For example, the predicate "Age" may be an allowed predicate for the domain of entertainment (e.g., age of an actor in movies, TV shows, etc.) and may also be an allowed predicate for the domain of shopping (e.g., the age of a customer). Enforcing a set of allowed predicates across multiple domains (e.g., enforcing the same set of allowed predicates across multiple domains) may allow a user of the system to use multiple data sets from multiple domains to generate/create an output data set.

Also as discussed above, the system allows different output data sets to be generated based on the different trust levels and/or trust chains. A user may provide a trust level and/or trust chain to the system to indicate the data sets and/or types of data that may be used to generate output data sets. In one embodiment, the trust level and/or trust chains may identify one or more provider modules, normalizer modules, matcher modules, inference modules, and/or merger modules. The data sets generated by the identified modules may be used (e.g., may be "trusted") to generate output data sets. For example, a user may provide a trust level and/or trust chain that indicates that the first provider module and the third provider module are trusted. The system may generate output data based on data sets 700 and 740 based on the trust level and/or trust chain. The system may not use the data set 720 based on the trust level and/or trust chain. In another example, the user may provide a trust level and/or trust chain identifying a first matcher module. The first matcher module may identify a same-as relationship 761 between Actor 11A and Actor 11C. A second matcher module may identify a same-as relationship 762 between Actor 11A and Actor 11B. Actor 11B includes an "Age" attribute indicating the age of Actor 11B. The Age attribute of Actor 11B may not be included in the output data set because the second matcher module is not indicated in the trust level and/or trust chain. The storage module may determine that the Age attribute of Actor 11B should not be used as the age for Actor 11A because the same-as relationship 762 is not trusted. In a further example, the trust level and/or trust chain may indicate whether inferred attributes and/or relationships should be used to generate the output data set. For example, son-of relationship 764 may indicate that Actor 11B is the son of Actor 12B and son-of relationship 765 may indicate that Actor 12B is the son of Actor 13B. Based on son-of relationships 764 and 765, an inference module may infer the grandfather-of relationship 763 (e.g., an inferred relationship) to indicate that Actor 13B is the grandfather of Actor 11B. If the trust level and/or trust chain indicates that inferred attributes and/or relationships should not be used, the grandfather-of relationship 763 (e.g., an inferred relationship) may not be used to generate the output data set (e.g., may not be included in the output data set).

In another embodiment, a trust level and/or trust chain may indicate whether normative attributes/relationships, positive attributes/relationships, types of positive attributes/relationships, and/or types of normative attributes/relationships are to be used when generating an output data set. For example, a trust level and/or trust chain may indicate that positive attributes and/or relationships (e.g., objective information such as age, dates, locations, etc.) may be used but normative attributes and/or relationships may not be used. Based on the trust level, the storage module may generate an output data set that includes the Gender of Actor 13C, the Age of Actor 12C, but does not include the Review of Movie 10A and the synopsis of Movie 10C. In another example, the trust level and/or trust chain may indicate that certain types of normative attributes and/or relationships may be used to generate the output data set. For example, the trust level and/or trust chain may indicate that the Synopsis attribute may be used (because the synopsis may have more objective qualities) and the Review attribute may not be used to generate the output data set. In a further example, a trust level and/or trust chain may indicate that positive attributes/relationships that are supported by other data sources may be used. For example, the sex/gender of an actor entity may be used to generate the output data set (e.g., may be included in the output data set) if multiple data sets (from multiple data providers) have the same sex/gender for the same actor entity.

As discussed above, the data and/or data sets may be received from different sources and/or origins. The data and/or data sets may be obtained as the result of original research (e.g., including human qualified entry), inspection (e.g., from looking at source data), and/or inference (e.g., data that is implied and/or inferred from original or inspected data). In one embodiment, the trust level and/or trust chain may also indicate whether data may be used to generate the output data set based on the origin of the data. For example, the Gender attribute of the Actor 13C may be based on data qualified or verified by a data provider (e.g., data that a human has verified). The trust level and/or trust chain may indicate that data that has been qualified by a data provider may be used to generate the output data set but that data that is inferred (e.g., data that is generated by an inference module) may not be used to generate the output data set.

As discussed above, the trust level and/or trust chain may indicate whether data and/or data sets may be used to generate an output data set. The trust level and/or trust chain may include rules to indicate whether data and/or data sets may be used to generate the output data set. For example, a rule may indicate that data sets from a first provider module are preferred over data sets from a second provider module (e.g., data sets from the second provider module should not be used unless there are no data sets from the first provider module). In another example, a rule may indicate that data sets from a provider module should be used if the data sets are up to date (e.g., the data sets should be used if the data sets have been updated and/or provided to the storage module since a specified time). The trust level and/or trust chain may also include lists, tables, and/or other data to indicate whether data and/or data sets may be used to generate the output data set. For example, the trust level may include a list of matcher modules (as discussed above). In one embodiment, the trust level and/or trust chain may be included in a matcher module. For example, a matcher module may include (e.g., may be implemented with) the trust level and/or trust chain (e.g. the rules, lists, tables, and/or other data). The matcher module may generate the output data based on the trust level and/or trust chain included in the matcher module. In another embodiment, the trust level and/or trust chain may be provided by a user to the storage module. For example, the user may provide one or more files that may include the trust level and/or trust chain. The storage module may generate the output data set based on the one or more files provided by the user.

Figure 8:
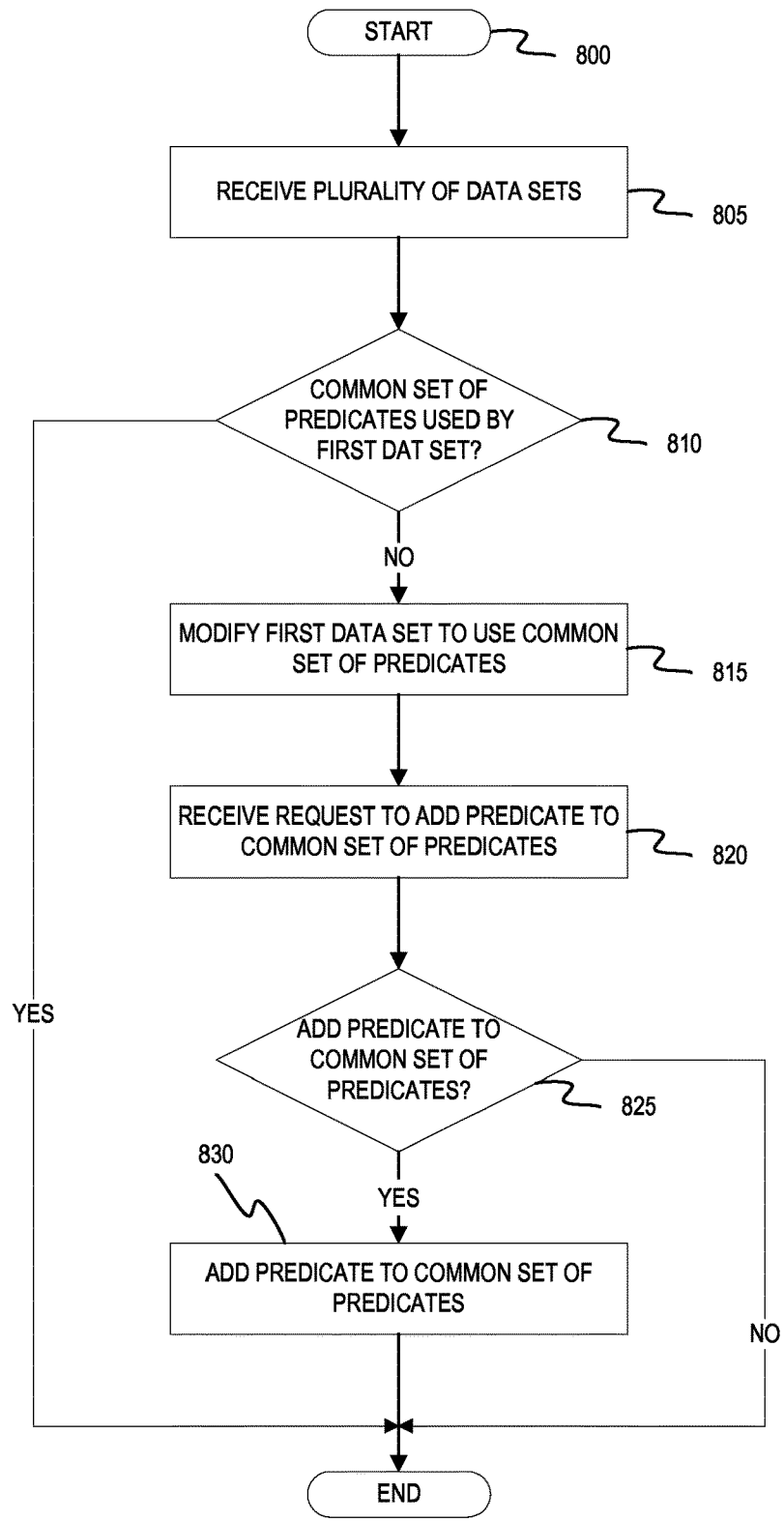
FIG. 8 is a flowchart representation of a method of enforcing a common set of predicates, in accordance with some embodiments.

FIG. 8 is a flowchart representation of a method of enforcing a common set of predicates, in accordance with some embodiments. In some implementations, the method 800 may be performed by one or more of a provider module (as illustrated in FIG. 1), a normalizer module (as illustrated in FIG. 1), a matcher module (as illustrated in FIG. 1), an inference module (as illustrated in FIG. 1), a merger module (as illustrated in FIG. 1), a storage module (as illustrated in FIG. 1), and/or a computing device (e.g., a server computing device). Briefly, method 800 includes receiving a plurality of data sets, determining whether a data set uses a common set of predicates (e.g., an allowed set of predicates), and modifying the data set if the data set does not use the common set of predicates.

The method 800 begins at block 805 where the method 800 receives a plurality of data sets from a plurality of data providers, a plurality of matcher modules, and a plurality of inference modules. The plurality of data sets may include conflicting data about one or more of an entity, an attribute, or a relationship between entities. For example, the plurality of data sets may include two different ages for an actor. The plurality of data sets may include same-as relationships identified by the plurality of matcher modules and may also include inferred data identified by the plurality of inference modules. For example, the plurality of data sets may include inferred attributes and/or relationships. At block 810, the method 800 determines whether a first data set from the plurality of data sets identifies entities, attributes, and relationships using a common set of predicates. For example, referring to FIG. 7, a data set may use the predicate "Sex" for the attribute that identifies the sex/gender of an actor. The method 800 may determine whether the predicate "Sex" is included in the allowed set of predicates.

If the data set identifies entities, attributes, and/or relationships using only predicates that are in the allowed or common set of predicates, the method 800 ends. If the data set does identify an entity, attributes, and/or relationship using a predicate that is not included in the allowed or common set of predicates, the method 800 modifies the first data set to identify entities, attributes, and relationships using the common set of predicates at block 815. For example, the method 800 may modify a predicate that is not allowed to an allowed predicate (as discussed above). The method 800 may optionally send a message and/or other data to indicate that the predicate was changed to an allowed predicate In another example, the method 800 may not modify predicates and may send a message and/or other data to indicate that a data set includes one or more predicates that are not in the allowed set of predicates. The method 800 may not allow the data set to be stored in the common data model for the system until the incorrect predicates are corrected.

At block 820, the system may optionally receive a request to add a predicate to the allowed or common set of predicates. For example, after receiving a message and/or other data indicating that the data set includes a predicate that is not in the allowed or common set of predicates, a user may send a request (e.g., a message) to the system indicating that the user wants to add the predicate to the allowed or common set of predicates. At block 825, the method 800 determines whether the predicate should be added to the allowed or common set of predicates. For example, a system administrator may determine whether the predicate should be added and may provide user input indicating whether the predicate should or should not be added. In another example, the system (e.g., the storage module) may determine whether the predicate should be added based on one or more of rules, a total number of requests (received by the system) to add the predicate to the common set of predicates, the domain associated with the common or allowed set of predicates, etc. If the predicate should be added to the common or allowed set of predicates (e.g., system administrator provides user input indicating that the predicate should be added), the method 800 may add the predicate to the common or allowed set of predicates at block 830. If the predicate should not be added to the common or allowed set of predicates (e.g., system administrator provides user input indicating that the predicate should not be added), the method 800 ends.

Figure 9:
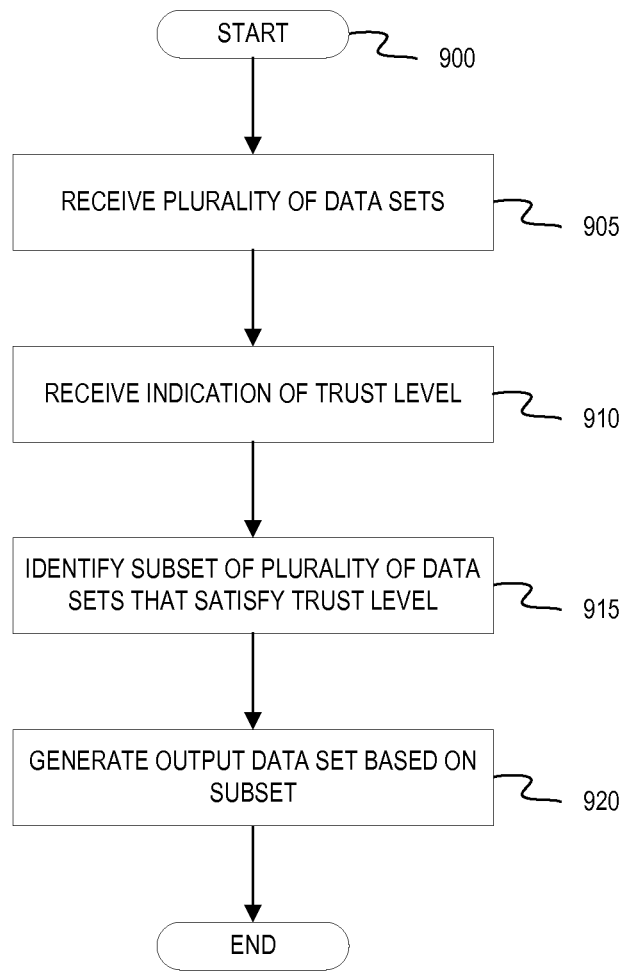
FIG. 9 is a flowchart representation of a method of generating a data set, in accordance with some embodiments.

FIG. 9 is a flowchart representation of a method of generating a data set, in accordance with some embodiments. In some implementations, the method 900 may be performed by one or more of a provider module (as illustrated in FIG. 1), a normalizer module (as illustrated in FIG. 1), a matcher module (as illustrated in FIG. 1), an inference module (as illustrated in FIG. 1), a merger module (as illustrated in FIG. 1), a storage module (as illustrated in FIG. 1), and/or a computing device (e.g., a server computing device). Briefly, method 900 includes receiving a plurality of data sets, receiving an indication of a trust level, and generating an output data set based on the trust level.

The method 900 begins at block 905 where the method 900 receives a plurality of data sets from a plurality of data providers, a plurality of matcher modules, and a plurality of inference modules. The plurality of data sets may include same-as relationships identified by the plurality of matcher modules and/or inferred data identified by the plurality of inference modules (as discussed above). At block 910, the method 900 receives an indication of a trust level. The trust level may indicate one or more of allowed data providers, allowed matcher modules, allowed inference modules, allowed relationship qualifiers, or allowed attribute qualifiers. For example, The trust level and/or trust chain may identify one or more provider modules, normalizer modules, matcher modules, inference modules, and/or merger modules that are trusted (e.g., as discussed above). The data sets generated by the identified modules may be used (e.g., may be "trusted") to generate the output data set. In another example, the trust level and/or trust chain may indicate whether inferred attributes and/or relationships should be used to generate the output data set. In a further example, the trust level and/or trust chain may indicate whether normative attributes/relationships, positive attributes/relationships, types of positive attributes/relationships, and/or types of normative attributes/relationships are to be used when generating the output data set. In one example, the trust level and/or trust chain may indicate that certain types of normative attributes and/or relationships may be used to generate the output data set. In another example, a trust level and/or trust chain may indicate that positive attributes/relationships that are supported by other data sources may be used. In yet another example, the trust level and/or trust chain may also indicate whether data may be used to generate the output data set based on the origin of the data. In an additional example, the trust level and/or trust chain may include rules indicating the data sets and/or types of data that may be used to generate the output data set (e.g., rules indicating a preferred matcher modules, provider modules, etc., as discussed above).

The method 900 may identify a first subset of the plurality of data sets that satisfy the trust level and/or trust chain at block 915. In one embodiment, the method 900 may also identify a subset of data within a data set that satisfies the trust level and/or trust chain. For example, the method 900 may identify a subset of the relationships and/or attributes within a data set that satisfy the trust level and/or trust chain. At block 920, the method 900 may generate an output data set based on the first subset. The output data set may include a subset of the same-as relationships and a subset of the inferred data.

Figure 10:
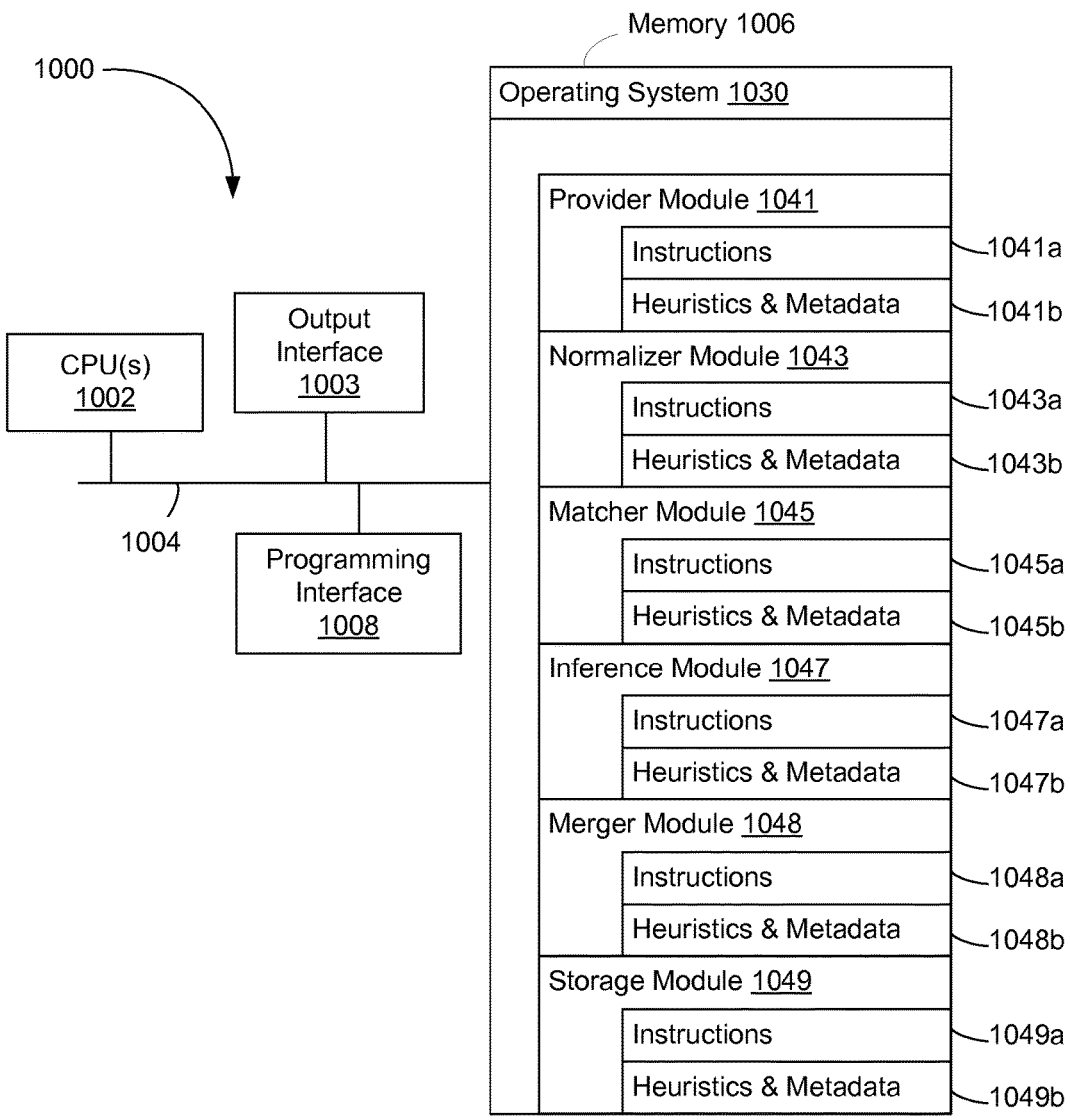
FIG. 10 is a block diagram of a computing device, in accordance with some embodiments.

FIG. 10 is a block diagram of the computing device 1000 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1000 includes one or more processing units (CPU's) 1002 (e.g., processors), one or more output interfaces 1003, a memory 1006, a programming interface 1008, and one or more communication buses 1004 for interconnecting these and various other components.

In some embodiments, the communication buses 1004 include circuitry that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some embodiments, the memory 1006 or the non-transitory computer readable storage medium of the memory 1006 stores the following programs, modules and data structures, or a subset thereof including an optional operating system 1030 and a media relay service module 1040. In some embodiment, one or more instructions are included in a combination of logic and non-transitory memory. The operating system 1030 includes procedures for handling various basic system services and for performing hardware dependent tasks.

In some embodiments, the provider module 1041 is configured to acquire and/or obtain data from different data sources. To that end, in some embodiments, the provider module 1041 includes a set of instructions 1041a and heuristics and metadata 1041b. In some embodiments, the normalizer module 1043 is configured to normalize data sets (as discussed above). To that end, in some embodiments, the normalizer module 1043 includes a set of instructions 1043a and heuristics and metadata 1043b. In some embodiments, the matcher module 1045 is configured to identify relationships between entities (as discussed above). To that end, in some embodiments, the matcher module 1045 includes a set of instructions 1045a and heuristics and metadata 1045b. In some embodiments, the inference module 1047 is configured to identify inferred relationship and inferred attributes (as discussed above). To that end, in some embodiments, the inference module 1047 includes a set of instructions 1047a and heuristics and metadata 1047b. In some embodiments, the merger module 1048 is configured to generate an output data set which may include rights-free data (as discussed above). For example, the merger module 1048 may generate an output data set based on a trust level and/or trust chain. To that end, in some embodiments, the merger module 1048 includes a set of instructions 1048a and heuristics and metadata 1048b. In some embodiments, the storage module 1049 is configured to enforce a common set of predicates and/or to generate an output data set based on a trust level and/or trust chain. To that end, in some embodiments, the storage module 1049 includes a set of instructions 1049a and heuristics and metadata 1049b.

Although the provider module 1041, normalizer module 1043, matcher module 1045, inference module 1047, merger module 1048, and storage module 1049 are illustrated as residing on a single computing device 1000, it should be understood that in other embodiments, any combination of the provider module 1041, normalizer module 1043, matcher module 1045, inference module 1047, merger module 1048, and storage module 1049 may reside on separate computing devices. For example, each of the provider module 1041, normalizer module 1043, matcher module 1045, inference module 1047, merger module 1048, and storage module 1049 may reside on a separate computing device.

Moreover, FIG. 10 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG.

10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   obtaining a first data set from a first data source and a second data set from a second data source, the first data set comprising a first plurality of entities and the second data set comprising a second plurality of entities;
   identifying a verified same-as relationship between a first entity from the first plurality of entities and a second entity from the second plurality of entities;
   comparing one or more entities of the first plurality of entities having respective indicated relationships with the first entity with one or more entities of the second plurality of entities having respective indicated relationships with the second entity;
   determining that a third entity from the first plurality of entities has an inferred same-as relationship with a fourth entity from the second plurality of entities based on comparing the one or more entities of the first plurality of entities having respective indicated relationships with the first entity with the one or more entities of the second plurality of entities having respective indicated relationships with the second entity;
   comparing one or more entities of the first plurality of entities having respective indicated relationships with the third entity with one or more entities of the second plurality of entities having respective indicated relationships with the fourth entity;
   classifying the inferred same-as relationship into one of a plurality of accuracy classes based on comparing the one or more entities of the first plurality of entities having respective indicated relationships with the third entity with the one or more entities of the second plurality of entities having respective indicated relationships with the fourth entity; and
   generating first output data indicating that the third entity has the classified inferred same-as relationship with the fourth entity.

2. The method of claim 1, wherein identifying the verified same-as relationship between the first entity and the second entity comprises:
   receiving data indicative of the verified same-as relationship.

3. The method of claim 1, wherein classifying the inferred same-as relationship comprises classifying the inferred same-as relationship as either a candidate same-as relationship or a qualified same-as relationship.

4. The method of claim 1, wherein classifying the inferred same-as relationship is based on a number of the one or more entities of the first plurality of entities having respective indicated relationships with the third entity that have respective same-as relationships with the one or more entities of the second plurality of entities having respective indicated relationships with the fourth entity.

5. The method of claim 4, wherein the inferred same-as relationship is classified as a qualified same-as relationship when the number exceeds a threshold number.

6. The method of claim 1, further comprising:
   identifying one or more of an inferred relationship or an inferred attribute of a fifth entity based on one or more of a relationship between entities of the first plurality of entities and the second plurality of entities or attributes of the first plurality of entities and the second plurality of entities.

7. The method of claim 1, further comprising:
   providing the first output data to an information system for naming, describing, or associating entities in the information system.

8. The method of claim 6, further comprising:
   generating second output data indicating one or more of the inferred relationship or the inferred attribute.

9. The method of claim 8, further comprising:
   generating third output data based on the first output data and the second output data, the third output data comprising rights-free data.

10. The method of claim 1, further comprising:
    receiving a plurality of data sets from a plurality of data providers, a plurality of matcher modules, and a plurality of inference modules, the plurality of data sets comprising same-as relationships identified by the plurality of matcher modules and inferred data identified by the plurality of inference modules;

receiving an indication of a trust level, the trust level indicative of one or more of allowed data providers, allowed matcher modules, allowed inference modules, allowed relationship qualifiers, or allowed attribute qualifiers;

identifying a first subset of the plurality of data sets that satisfy the trust level; and generating an output data set based on the first subset, the output data set comprising a second subset of same-as relationships and a third subset of the inferred data.

11. The method of claim 1, further comprising:

receiving a plurality of data sets from a plurality of data providers, a plurality of matcher modules, and a plurality of inference modules, the plurality of data sets comprising conflicting data about one or more of an entity, an attribute, or a relationship between entities, further comprising same-as relationships identified by the plurality of matcher modules, and further comprising inferred data identified by the plurality of inference modules;

determining whether a first data set from the plurality of data sets identifies entities, attributes, and relationships using a common set of predicates; and modifying the first data set to identify entities, attributes, and relationships using the common set of predicates when the first data set does not use the common set of predicates.

12. A system comprising:

a processor; and a combination of logic and non-transitory memory including instructions, that when at least executed in part by the processor cause the system to:

obtain a first data set from a first data source and a second data set from a second data source, the first data set comprising a first plurality of entities and the second data set comprising a second plurality of entities;

identify a verified same-as relationship between a first entity from the first plurality of entities and a second entity from the second plurality of entities;

compare one or more entities of the first plurality of entities having respective indicated relationships with the first entity with one or more entities of the second plurality of entities having respective indicated relationships with the second entity;

determine that a third entity from the first plurality of entities has an inferred same-as relationship with a fourth entity from the second plurality of entities based on comparing the one or more entities of the first plurality of entities having respective indicated relationships with the first entity with the one or more entities of the second plurality of entities having respective indicated relationships with the second entity;

compare one or more entities of the first plurality of entities having respective indicated relationships with the third entity with one or more entities of the second plurality of entities having respective indicated relationships with the fourth entity;

classify the inferred same-as relationship into one of a plurality of accuracy classes based on comparing the one or more entities of the first plurality of entities having respective indicated relationships with the third entity with the one or more entities of the second plurality of entities having respective indicated relationships with the fourth entity; and generate first output data indicating that the third entity has the classified inferred same-as relationship with the fourth entity.

13. The system of claim 12, wherein classifying the inferred same-as relationship comprises classifying the inferred same-as relationship as either a candidate same-as relationship or a qualified same-as relationship.

14. The system of claim 12, wherein classifying the inferred same-as relationship is based on a number of the one or more entities of the first plurality of entities having respective indicated relationships with the third entity that have respective same-as relationships with the one or more entities of the second plurality of entities having respective indicated relationships with the fourth entity.

15. The system of claim 14, wherein the inferred same-as relationship is classified as a qualified same-as relationship when the number exceeds a threshold number.

16. The system of claim 12, wherein the combination of logic and non-transitory memory further cause the processor to:

provide the first output data to an information system for naming, describing, or associating entities for TV or video, social media, online shopping, or web content.

17. The system of claim 12, wherein the combination of logic and non-transitory memory further cause the processor to:

identify one or more of an inferred relationship or an inferred attribute of a fifth entity based on one or more of a relationship between entities of the first plurality of entities and the second plurality of entities or attributes of the first plurality of entities and the second plurality of entities.

18. The system of claim 12, wherein the combination of logic and non-transitory memory further cause the processor to:

generate second output data indicating one or more of the inferred relationship or the inferred attribute.

19. The system of claim 18, wherein the combination of logic and non-transitory memory further cause the processor to:

generate third output data based on the first output data and the second output data, the third output data comprising rights-free data.

* * * * *